United States Patent
Aghili et al.

(10) Patent No.: US 7,403,826 B2
(45) Date of Patent: Jul. 22, 2008

(54) METHOD AND SYSTEM FOR TORQUE/FORCE CONTROL OF HYDRAULIC ACTUATORS

(75) Inventors: Farhad Aghili, Brossard (CA); Mehrzad Namvar, Longueuil (CA)

(73) Assignee: Canadian Space Agency, St. Hubert, Quebec (CA)

( * ) Notice: Subject to any disclaimer, the term of this patent is extended or adjusted under 35 U.S.C. 154(b) by 266 days.

(21) Appl. No.: 11/289,439

(22) Filed: Nov. 30, 2005

(65) Prior Publication Data

US 2006/0116783 A1 Jun. 1, 2006

Related U.S. Application Data

(60) Provisional application No. 60/631,990, filed on Dec. 1, 2004.

(51) Int. Cl.
    G05B 13/02 (2006.01)

(52) U.S. Cl. ........................................ 700/28

(58) Field of Classification Search ................... 700/28
    See application file for complete search history.

(56) References Cited

U.S. PATENT DOCUMENTS

| 4,647,004 | A | * | 3/1987 | Bihlmaier | .................. | 251/28 |
| 5,209,661 | A | * | 5/1993 | Hildreth et al. | ............... | 434/45 |
| 5,953,977 | A | * | 9/1999 | Krishna et al. | ................. | 91/361 |
| 6,084,371 | A | * | 7/2000 | Kress et al. | ................... | 318/566 |
| 6,212,466 | B1 | * | 4/2001 | Ulyanov et al. | ............... | 701/99 |
| 6,904,422 | B2 | * | 6/2005 | Calise et al. | ................... | 706/23 |
| 6,968,241 | B2 | * | 11/2005 | Vonnoe et al. | ................. | 700/61 |
| 7,277,764 | B2 | * | 10/2007 | Hovakimyan et al. | ......... | 700/28 |

OTHER PUBLICATIONS

Laval et al., "H—Force Control of a Hydraulic Servo-Actuator with Environmental Uncertainties", *Proceedings of the 1996 IEEE International Conference on Robotics and Automation*, pp. 1566-1571.

Sohl et al., "Experiments and Simulations on the Nonlinear Control of a Hydraulic Servosystem", *IEEE Transactions on Control Systems Technology*, vol. 7, No. 2, Mar. 1999, pp. 238-247.

Vossoughi et al., Dynamic Feedback Linearization for Electrohydraulically Actuated Control Systems, *Transactions of the ASME*, vol. 117, 1995, pp. 468-477.

Habibi, "Design of a New High-Performance ElectroHydraulic Actuator", *IEEE/ASME Transactions on Mechatronics*, vol. 5, No. 2, Jun. 2000, pp. 158-164.

Liu et al., "Nonlinear Force/Pressure Tracking of an Electro-Hydraulic Actuator", *14th Triennial World Congress, Beijing, P.R., China*, pp. 469-474.

* cited by examiner

*Primary Examiner*—Thomas K Pham
(74) *Attorney, Agent, or Firm*—Curtis B. Behmann; Borden Ladner Gervais LLP

(57) ABSTRACT

A combined scheme of identification and torque control is provided for rotary hydraulic actuators. The composite controller consists of a dynamic feedback linearizing inner loop cascaded with a robust linear feedback outer loop. The proposed controller allows the actuator to generate desired torque irrespective of the actuator motion. In fact, the controller reduces significantly the impedance of the actuator as seen by its external load, making the system an ideal source of torque suitable for many robotics and automation applications. An identification method to extract the parameters of non-linear model of actuator dynamics and to estimate a bound for modeling uncertainty, used for synthesis of the outer optimal controller, is also presented. Results are illustrated experimentally on a pitch actuator of a Schilling industrial robot.

19 Claims, 11 Drawing Sheets

METHOD AND SYSTEM FOR TORQUE/FORCE CONTROL OF HYDRAULIC ACTUATORS

CROSS-REFERENCE TO RELATED APPLICATIONS

This application claims the benefit of priority of U.S. Provisional Patent Application No. 60/631,990 filed Dec. 1, 2004, which is incorporated herein by reference.

FIELD OF THE INVENTION

The present invention relates generally to control systems and their design. More particularly, the present invention relates to a torque control system for a hydraulic actuator and the design of such system.

BACKGROUND OF THE INVENTION

Hydraulic actuators are widely used to drive robotic manipulators in industry for tasks such as earth moving, material handling, construction and manufacturing automation due to their large power-to-mass ratio. However, precise control of hydraulic actuators is more difficult than control of conventional electric motors due to the presence of non-linear flow-pressure characteristics, such as: variations in the trapped fluid volume in each actuator chamber; fluid compressibility; friction between moving parts; variations of hydraulic parameters; presence of leakage; and transmission non-linearities.

Much of the work on hydraulic control relies on linear control design methodology that is based on local liberalization of the actuator dynamics about a nominal operating point. However, these methods suffer from two major drawbacks: First, since the actuator dynamics are highly non-linear, a single linear time invariant controller can be only tuned for a particular operating point and the performance degrades as the system state moves away from the operating point. Second, since the dynamics of actuator and load are coupled together, the dynamics of the load (which can be very complex) are implicitly embedded in the linearized model of the actuator, which complicates the treatment of the situation; it is then difficult to achieve precise control. As a result, these methods rely highly on the knowledge of the load characteristics and variation in those characteristics.

Mechatronics systems, such as electro-hydraulic robot manipulators, are essentially multi-dimensional non-linear systems composed of mechanical and actuator subsystems accounting for load dynamics and actuator dynamics, respectively. The control problem can be greatly simplified in many applications, if actuators behave as an ideal source of force/torque with low impedance, i.e. similar to electric motors. However, the force/torque generated by a hydraulic actuator is affected by its own motion resulting in a coupled dynamics of the actuator and load.

To account for parametric uncertainty of estimated and/or somewhat inaccurate parameters, non-linear adaptive control methods have previously been employed. An adaptive robust method can also be used, which takes the nonparametric unmodeled dynamics into account by assuming a known bound on the nonparametric uncertainty.

Dynamic feedback linearization has been used to attempt to cancel out the actuator non-linear dynamics. The advantage of this method is that for force control purpose, no knowledge of load dynamics is required because it cancels out the effect of velocity perturbation. However, in practice, exact cancellation of the actuator dynamics is not possible due to parametric and nonparametric modeling uncertainties. This problem has been addressed by transforming the linearized system into standard linear fractional uncertain structures; however, no method has been presented for computation of uncertainty bounds.

The control of a torque/force output is very different in nature from known attempts to control motion or position. When a controller is for controlling a system in which there is no motion, or negligible motion, much of the hydraulic behaviour is masked, and friction is the main observable factor affecting the system. This is one reason why many known systems seek to compensate for frictional components. It is also necessary to consider the dynamics of the whole system together, namely the combination of the actuator and the load. In torque/force control situations such as those discussed according to embodiments of the present invention, it is necessary to consider the effect of velocity on the system; as such, the torque/force control problem is quite different in nature from the motion and displacement control problems.

It is, therefore, desirable to provide a procedure for identification of actuator non-linear dynamics and quantification of modelling error. Most existing adaptive methods deal only with parametric uncertainties and some robust adaptive schemes assume a known bound for non-parametric uncertainties in actuator non-linear dynamics. No method is known to estimate this bound, and attempts to account for non-linear dynamics have drawbacks.

SUMMARY OF THE INVENTION

It is an object of the present invention to obviate or mitigate at least one disadvantage of previous torque/force controllers and methods of their design.

The robot control problem is simplified by minimizing the coupling between the two sub-systems that can be achieved by minimizing the effect of velocity disturbance on actuator torque. Then the robot control problem is effectively reduced to the torque control of the hydraulic actuator and the control of the multi-body dynamics of a manipulator that traditionally relies on torque control inputs.

In a first aspect, the present invention provides a controller for a hydraulic actuator, the hydraulic actuator being for generating a manipulating influence to be applied to a load. The controller includes a linearizing controller for storing a linear model representing non-linear dynamic behaviour of an unloaded hydraulic actuator. The linearizing controller is shown as part of an inner loop. A robust linear controller is also provided for compensating for non-linearities in the linear model using an uncertainty model having a non-linear component, and an estimated bound for the uncertainty model. The robust linear controller is shown as part of an outer loop, preferably cascaded with the inner loop.

In the case where the hydraulic actuator includes a joint, the non-linear dynamic behaviour of the unloaded hydraulic actuator can be obtained by substantially minimizing effects of the load on the manipulating influence. This is achieved by perturbing the linear model in response to a velocity of the joint. The linear model can be based on measured linear parameters of the hydraulic actuator. The linearizing controller can include means for obtaining the linear model based on a linearizing control law for the hydraulic actuator, or means for determining the linearizing control law for the hydraulic actuator. The controller can further include means for calculating the estimated bound. The manipulating influence can include a torque or a force, and the hydraulic actuator can be a rotary hydraulic actuator or a linear hydraulic actuator.

In another aspect, the present invention provides a control architecture for torque control of a hydraulic actuator. The control architecture includes a dynamic feedback linearizing inner loop, and a robust linear feedback outer loop. The outer loop is cascaded with the inner loop to permit the actuator to generate a desired torque irrespective of motion of the hydraulic actuator.

In a further aspect, the present invention provides a method of designing a hydraulic actuator controller. The method includes the following steps: determining an uncertainty model for a linearized model of the hydraulic actuator, the uncertainty model including a non-linear component; estimating an uncertainty bound, for the uncertainty model, based on identified parameters of non-linear behaviour of the actuator; and designing a robust linear controller based on the determined uncertainty model and the estimated uncertainty bound.

The step of estimating the uncertainty bound can include the following steps: applying a linearizing control law using control input as an excitation signal; identifying a linear discrete time model as the uncertainty model, based on measured values of torque and control input; and computing a minimum value of the uncertainty bound such that the uncertainty model is not invalidated by the measured values of torque and control input.

The non-linear component can be based on unmodeled actuator dynamics. The linearizing control law can be a dynamic feedback linearizing control law. The step of designing the robust linear controller can include imposing robust stability and performance constraints based on characteristics of the uncertainty model. The method can further include the step of calculating a linearizing control law based on the identified parameters of non-linear behaviour of the actuator. The method can further include the step of extracting the identified parameters based on measured signals.

According to another aspect, the present invention provides a computer-readable storage medium, comprising statements and instructions which, when executed, cause a computer to perform a method according to embodiments of the present invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
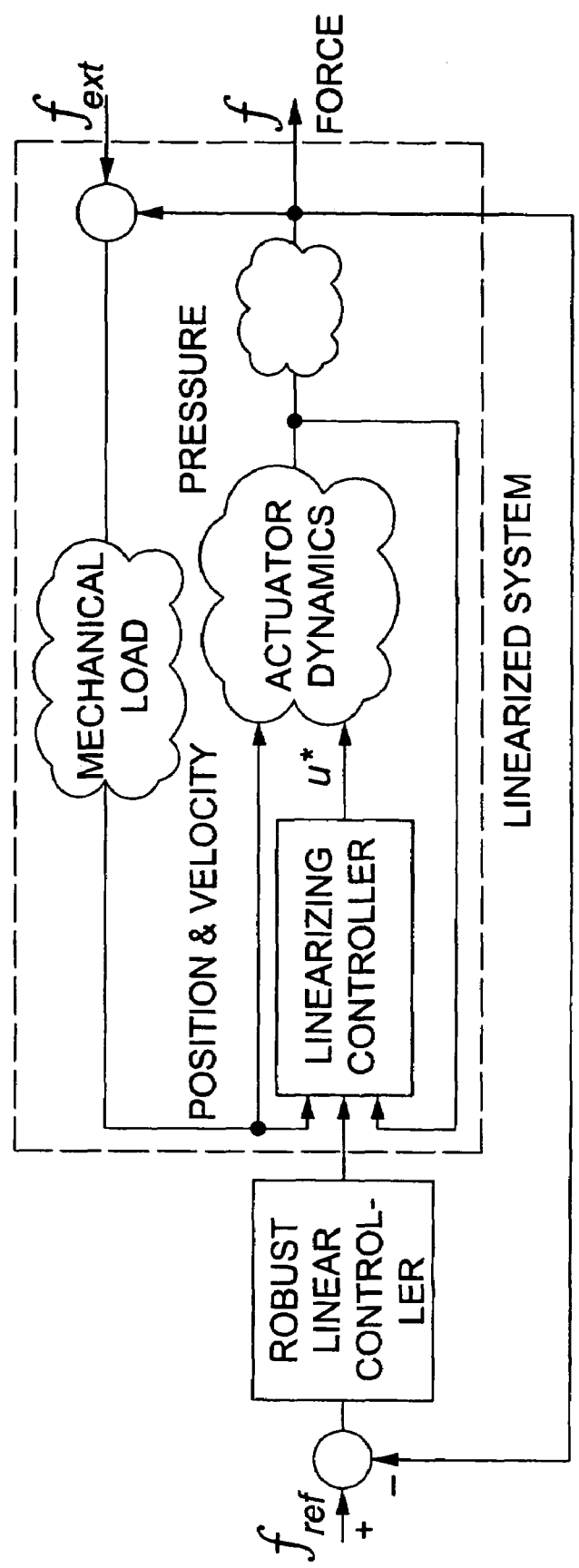
FIG. 1A is a block diagram of a force controller according to an embodiment of the present invention.

Generally, the present invention provides a method and system for identification and torque/force control for hydraulic actuators, such as rotary hydraulic actuators. The methodology can be readily applied to linear hydraulic actuators. The composite controller consists of a dynamic feedback linearizing inner loop cascaded with a robust linear feedback outer loop. The proposed controller allows the actuator to generate desired torque irrespective of the actuator motion. In fact, the controller reduces significantly the impedance of the actuator as seen by its external load, making the system an ideal, or substantially ideal, source of torque suitable for many robotics and automation applications. An identification method to extract the parameters of non-linear model of actuator dynamics and to estimate a bound for modeling uncertainty, used for synthesis of the outer optimal controller, is also presented. Results are illustrated experimentally on a pitch actuator of a Schilling industrial robot.

In the realm of hydraulic actuators, rotary hydraulic actuators produce a torque output, whereas linear hydraulic actuators produce a force output. The term "manipulating influence" is used herein to represent either a torque or a force, and is used as a generic term to cover both possibilities, depending on whether a hydraulic actuator is linear or rotary. The terms "torque/force control" and "hydraulic actuator output control" are used herein to refer to the control of the output of the hydraulic actuator, whether it is a linear or rotary actuator. The terms "torque/force controller" and "hydraulic actuator output controller" as used herein represent a controller for controlling force (in the case of a rotary actuator) and/or for controlling torque (in the case of a linear actuator). Of course, the term "controller" is also used herein to refer to a torque/force controller. The term "velocity" is used herein to represent a speed and trajectory (either linear or angular). Though reference is made to actuator velocity, joint velocity, and load velocity, it is to be understood that each of these velocities is describing the same velocity in the case where an actuator is applying a torque/force to a load. As such, a calculation of load velocity can be used to determine actuator velocity.

The control of a torque/force output is very different in nature from known attempts to control motion or position. When a controller is for controlling a system in which there is no motion, or negligible motion, much of the hydraulic behaviour is masked, and friction is the main observable factor affecting the system. This is one reason why many known systems seek to compensate for frictional components. It is also necessary to consider the dynamics of the whole system together, namely the combination of the actuator and the load. In torque/force control situations such as those discussed according to embodiments of the present invention, it is necessary to consider the effect of velocity on the system; as such, the torque/force control problem is quite different in nature from the motion and displacement control problems. In torque/force control according to embodiments of the present invention, the two subsystems are decoupled by way of velocity feedback. This results in system modularity. It is no longer required to model the environment, since the actuator can be controlled independently of the effects of the load.

The robot control problem is greatly simplified by minimizing the coupling between the two sub-systems that can be achieved by minimizing or eliminating the effect of velocity disturbance on actuator torque. Then the robot control problem is reduced to the torque control of hydraulic actuator and the control of the multi-body dynamics of manipulator that traditionally relies on torque control inputs.

A combined scheme of identification and torque control is described for hydraulic actuators, such as rotary hydraulic actuators. The methodology is readily applicable for linear hydraulic actuators. The composite controller includes a dynamic feedback linearizing inner loop cascaded with an optimal robust linear feedback outer loop. The proposed controller allows the actuator to generate desired torque irrespective of the actuator motion. In fact, the controller reduces significantly the impedance of the actuator as seen by its external load, making the system an ideal source of torque suitable for many robotics and automation applications. Discussion of and "ideal" source herein is to be understood as referring to a source having behaviour that is substantially ideal.

The controller allows a hydraulic actuator to generate desired torque or force regardless of actuator motion. It can reduce significantly the impedance of the actuator as seen by its external load, making the system an ideal, or near ideal, source of torque or force suitable for many robotics and automation applications. The dynamic feedback linearizing controller can be constructed based on an identification procedure which identifies parameters of actuator non-linear model. Since the feedback-linearized model is not perfectly "linear", a novel identification procedure is developed to fit an "uncertain" model structure to the almost linearized system. The robust outer-loop controller permits to consider different types of performance objective, either in time domain or in frequency domain. The proposed linear robust outer-loop controller presents a very efficient means for attenuating limit-cycle oscillations in servo-valve dynamics, and is discrete and easily implementable. All design procedures can be realized by means of powerful convex optimization algorithms.

The identification and control scheme according to embodiments of the present invention relies neither on a priori knowledge of load dynamics nor external torques, and makes the controlled actuator as a source of torque with low impedance, i.e. acting virtually as an electro-motor. Moreover, no a prior assumption is made on a bound for actuator unmodeled dynamics. The bound is estimated via an identification procedure. The controller synthesis procedure allows imposing several performance objectives either in time-domain or frequency domain and it comprises numerically tractable convex optimizations. An identification method to extract the parameters of non-linear model of actuator dynamics and to estimate a bound for modelling uncertainty, used for synthesis of the outer optimal controller, is also presented.

FIG. 1A is a block diagram of a force controller according to an embodiment of the present invention. This figure is similar in nature to FIG. 1B, except that it illustrates the system more generally, and indicates forces rather than torques. As mentioned earlier, it is the type of actuator (linear or rotary) that determines whether embodiments of the present invention will act to control force or to control torque; the system itself is the same in either case. The controller is for a hydraulic actuator, the hydraulic actuator being for generating a manipulating influence to be applied to a load. The controller includes a linearizing controller for storing a linear model representing non-linear dynamic behaviour of an unloaded hydraulic actuator. The linearizing controller is shown as part of an inner loop. A robust linear controller is also provided for compensating for non-linearities in the linear model using an uncertainty model having a non-linear component, and an estimated bound for the uncertainty model. The robust linear controller is shown as part of an outer loop, preferably cascaded with the inner loop.

In the case where the hydraulic actuator includes a joint, the non-linear dynamic behaviour of the unloaded hydraulic actuator can be obtained by substantially minimizing effects of the load on the manipulating influence. This is achieved by perturbing the linear model in response to a velocity of the joint. The linear model can be based on measured linear parameters of the hydraulic actuator. The linearizing controller can include means for obtaining the linear model based on a linearizing control law for the hydraulic actuator, or means for determining the linearizing control law for the hydraulic actuator. The controller can further include means for calculating the estimated bound. The manipulating influence can include a torque or a force, and the hydraulic actuator can be a rotary hydraulic actuator or a linear hydraulic actuator.

Described in a different manner, an embodiment of the present invention provides a control architecture for torque control of a hydraulic actuator. The control architecture includes a dynamic feedback linearizing inner loop, and a robust linear feedback outer loop. The outer loop is cascaded with the inner loop to permit the actuator to generate a desired torque irrespective of motion of the hydraulic actuator.

Figure 1B:
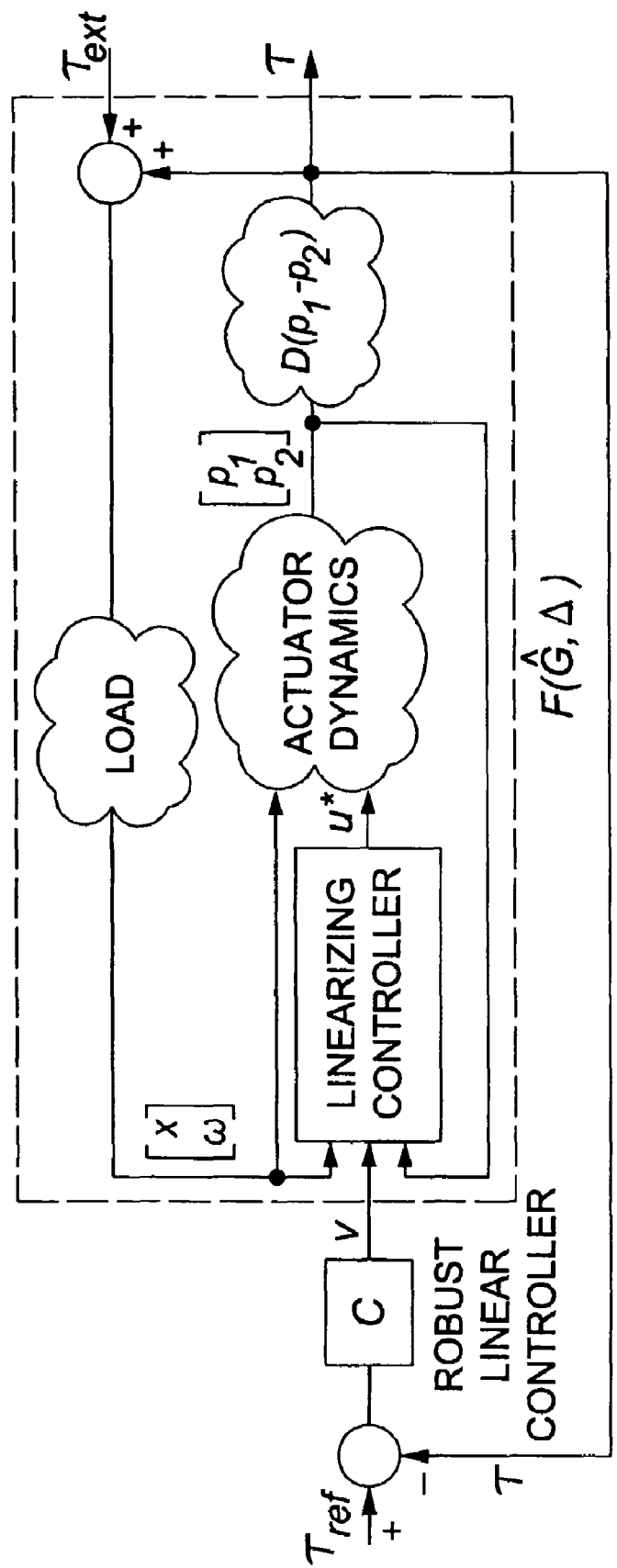
FIG. 1B is a block diagram of a torque controller according to an embodiment of the present invention.

As shown in FIG. 1B, the actuator velocity and position are produced as a result of actuator torque $\tau$ superimposed with external torque $\tau_{ext}$. On the other hand, actuator velocity and motion, in turn, affect actuator torque through non-linear actuator dynamics. In this application the effect of velocity on generated torque is considered as disturbance. As such, the control objective is to solve two tasks: compensate for non-linear dynamics for achieving accurate reference tracking; and minimize sensitivity to velocity disturbance, that is equivalent to increase the back-drivability of the actuator or to decrease its impedance.

According to an embodiment of the present invention, the proposed controller scheme includes three main stages, with an optional initial stage, which can be implemented first. In the initial stage, parameters of the actuator non-linear model are identified. This identification can be achieved using the measured signals (actuator position, velocity, and chamber pressures) and by a standard least squares algorithm.

In the first main stage, using the identified parameters of the actuator non-linear model, a dynamic feedback linearizing control law u* is calculated (See FIG. 1B). The term "control law" as used in this specification is a common term in the art used to designate a control relationship that has been determined to be true for a particular arrangement. Neglecting the servo-valve dynamics, this command ideally transforms the non-linear system into a simple integrator if v is considered as a new input and $\tau$ as output. However, in the course of identification experiments it becomes obvious that there are non-negligible discrepancies between the non-linear model of actuator whose parameters are optimally identified and the true system. This implies that the non-linear model cannot perfectly capture the dynamical behavior of the actuator and that the dynamic mapping from v to $\tau$ differs from an integrator. Therefore, having implemented the feedback linearization, we perform the second round of identification to fit an uncertainty model structure to the dynamic mapping from v to $\tau$. This uncertainty model structure includes a linear time-invariant (LTI) model $\hat{G}$ and a non-linear operator $\Delta$ that represents both the parametric and non-parametric uncertainties of the actuator model ($F(\hat{G}, \Delta)$ in FIG. 1B). Herein no assumption is made on the value of the uncertainty bound; instead, this bound is estimated from the identification procedure. It is worthwhile to notice that the model uncertainty represented by the operator $\Delta$ is non-linear and the standard methods for uncertainty bounding in system identification theory are not applicable in this case. The proposed identification method is based on the recent results in model validation.

The third stage of the proposed method is to design the external linear controller C satisfying several performance and robust stability requirements. Specifically, we translate these requirements into $l_1$ or $H_\infty$ control design specifications that in turn, are formulated by some mixed Linear Programming and Linear Matrix Inequality constraints.

Based on the identified non-linear model, a dynamic feedback linearizing control law can be calculated. This command should ideally transform the non-linear system into a simple Integrator. However, due to imperfect parameter identification and the presence of unmodeled dynamics, the feedback-linearized system may deviate from a simple integrator model.

Figure 2:
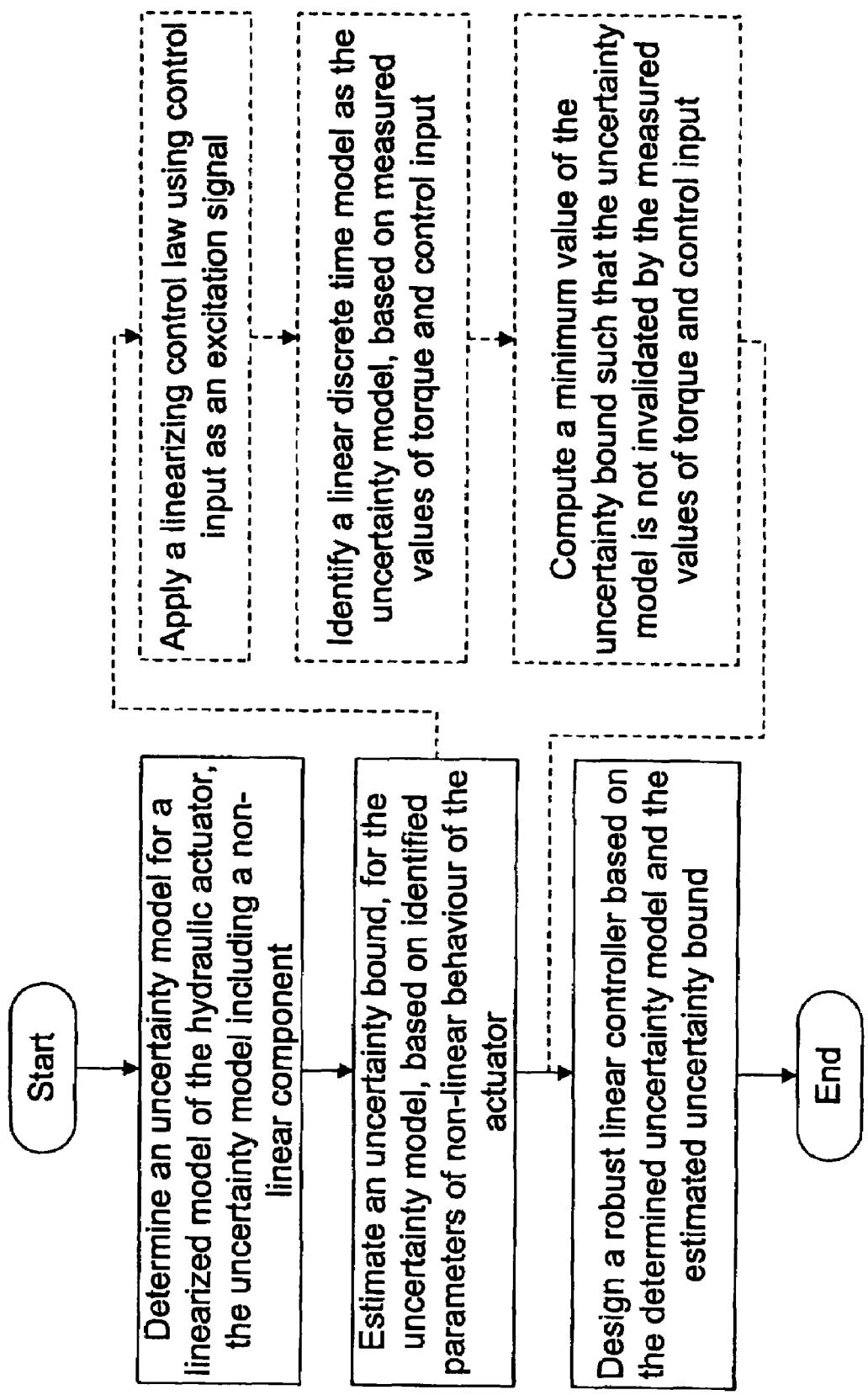
FIG. 2 is a flowchart illustrating a method of designing a hydraulic actuator controller according to an embodiment of the present invention.

To describe the foregoing in a different manner, reference is made to FIG. 2, which is a flowchart illustrating a method of designing a hydraulic actuator controller according to an embodiment of the present invention. The method of designing a hydraulic actuator controller according to an embodiment of the present invention includes the following steps: determining an uncertainty model for a linearized model of the hydraulic actuator, the uncertainty model including a non-linear component; estimating an uncertainty bound, for the uncertainty model, based on identified parameters of non-linear behaviour of the actuator; and designing a robust linear controller based on the determined uncertainty model and the estimated uncertainty bound.

FIG. 2 also illustrates some optional steps, which can be included in the step of estimating the uncertainty bound. The optional steps are as follows: applying a linearizing control law using control input as an excitation signal; identifying a linear discrete time model as the uncertainty model, based on measured values of torque and control input; and computing a minimum value of the uncertainty bound such that the uncertainty model is not invalidated by the measured values of torque and control input.

The non-linear component can be based on unmodeled actuator dynamics. The linearizing control law can be a dynamic feedback linearizing control law. The step of designing the robust linear controller can include imposing robust stability and performance constraints based on characteristics of the uncertainty model (such constraints will be described later). The method can further include the step of calculating a linearizing control law based on the identified parameters of non-linear behaviour of the actuator. The method can further include the step of extracting the identified parameters based on measured signals.

Expressed in a slightly different manner, according to an embodiment of the invention, there is provided a method of designing a hydraulic actuator controller, comprising: determining an uncertainty model to compensate for differences between a linearized model of the hydraulic actuator and actual behaviour of the hydraulic actuator, the uncertainty model including a non-linear component; estimating an uncertainty bound, for the uncertainty model, based on identified parameters of non-linear behaviour of the actuator; and designing a robust linear controller based on the determined uncertainty model and the estimated uncertainty bound. The uncertainty model can include a linear time invariant model component.

A method according to an embodiment of the present invention can alternatively be described as an identification method for designing a hydraulic actuator controller. The method includes the following steps: determining the parameters of the non-linear model of the actuator dynamics; designing a linearizing control law based on the determined non-linear model; fitting an "uncertain" model structure to the almost linearized system, and estimating an uncertainty bound for the modelling uncertainty; and designing a robust linear controller based on the determined uncertainty model and the estimated uncertainty bound.

The model structure can include a linear time-invariant (LTI) model and an uncertainty block representing all factors that affect linearization quality. The LTI model together with an upper-bound for the uncertainty block can be estimated by an identification procedure. The identification method can handle non-linear uncertainty blocks, as opposed to existing methods that handle mainly linear uncertainties. The identification scheme requires no "a priori" information on the system dynamics.

The step of estimating the uncertainty bound can include the following steps: using a linearizing control input as an excitation signal and torque as the output signal; identifying a linear discrete time model as the uncertainty model, based on measured values of input/output signals; and computing a minimum value of the uncertainty bound such that the uncertainty model is not invalidated by the measured values of torque and control input signals.

Actuator Dynamics

The dynamics of hydraulic pressure of the chambers assuming compressible fluid are described by $$\frac{1}{\beta}\begin{bmatrix} \dot{p}1 \\ \dot{p}2 \end{bmatrix} = \begin{bmatrix} \frac{-c_l - c_{el}}{V_1(x)} & \frac{c_l}{V_1(x)} \\ \frac{c_l}{V_2(x)} & \frac{-c_l - c_{el}}{V_2(x)} \end{bmatrix} \begin{bmatrix} p1 \\ p2 \end{bmatrix} + p_a \begin{bmatrix} \frac{c_{el}}{V_1(x)} \\ \frac{c_{el}}{V_2(x)} \end{bmatrix} + \begin{bmatrix} \frac{-D}{V_1(x)} \\ \frac{D}{V_2(x)} \end{bmatrix} \omega + c_p \begin{bmatrix} \frac{\sqrt{K_1}}{V_1(x)} \\ \frac{\sqrt{K_2}}{V_2(x)} \end{bmatrix} u \quad (1)$$

where $\beta$ is the effective bulk modulus, $p_1$, $p_2$ are pressures inside the two chambers of actuator, x is the position angle, $V_1(x)=V_0+Vx(V_2(x)=V_0-Dx)$ is the trapped fluid volume in the first (second) chamber, respectively. D is the volume displacement of actuator and $x \in (-D^{-1}V_0, D^{-1}V_0)$.

The coefficients of the internal and external leakages are denoted by $c_l$ and $c_{el}$, respectively. u is the spool-valve displacement and $$K_i = 0.5(p_s-p_a)-(-1)^i \text{sgn}(u)[0.5(p_s+p_a)-p_i], i=1,2, \quad (2)$$

where $p_s$ is the supply pressure, $p_a$ is the external pressure and $c_p$ is the discharge coefficient of the valve. In this embodiment, we assume an identical discharge coefficient $c_p$, for both inlet and outlet ports of the valve, although some servo-valves have larger $c_p$, for the outlet ports than the inlet ports. Generally, $c_p$, depends on liquid density, however in this embodiment $c_p$ is considered constant. Obviously, it is possible to change the equations if different assumptions are made.

In this embodiment we neglect the servo-valve dynamics and hence the servo-valve displacement u is treated directly as control input signal. The torque generated by a rotary hydraulic actuator $\tau$ is proportional to the pressure difference between the two chambers, i.e.

$$\tau = D(p_1-p_2) \quad (3)$$

| | | | |
|---|---|---|---|
| $\beta$ | Effective bulk modulus | D | Volume displacement |
| $c_p$ | Discharge coefficient of valve | $c_l$ | Internal leakage |
| $c_{el}$ | External leakage | $V_{1,2}$ | Trapped fluid volume in chambers |
| $V_0$ | Initial fluid volume | x | Position angle |
| $\omega$ | Angular velocity | $q_{1,2}$ | Supplied flows |
| $p_{1,2}$ | Pressure inside the two chambers | u | Servo-valve displacement (control input) |
| $P_a$ | External pressure | | |
| $\tau$ | Hydraulic torque | $P_s$ | Supply pressure |
| v | Control input for linearized system | $\tau_{ref}$ | Torque reference signal |
| $\tau_{ext}$ | External torque disturbance | $\gamma$ | Upperbound for uncertainty |
| C | External controller | $\theta$ | Vector of parameters |

Input-to-torque Exact Linearization

Differentiating the actuator torque in (3) with respect to time and replacing $\dot{p}1$ and $\dot{p}2$ from the actuator dynamics equations yields (4) as follows:

$$\dot{\tau} = -\beta D(c_l+c_{el})P(x)(p_1-p_2)+\beta Dc_{el}P_1(x)p_a-\beta D^2P(x)\omega+\beta Dc_p Q(p_1,p_2,x,u)u$$

where $\omega = \dot{x}$ is the angular velocity of the actuator, and P(x), $P_1(x)$ and $Q(p_1, p_2, x, u)$ are defined by $$P(x)=V_1(x)^{-1}+V_2(x)^{-1} \quad (5)$$

$$P(x)=V_1(x)^{-1}-V_2(x)^{-1} \quad (6)$$

$$Q(p_1,p_2,x,u)=V_1(x)^{-1}\sqrt{K_1}+V_2(x)^{-1}\sqrt{K_2} \quad (7)$$

Equation (1) describes the second order dynamics of the actuator. The fact that the command signal u appears in the first derivative of the generated torque shows that the relative degree of the system is one. It is evident from Equation (4) that the actuator torque depends on two inputs: motion variables i.e. position and velocity [x, $\omega$] and spool-valve displacement u. Herein, the former is treated as known disturbance, while the latter is considered as control input. The goal of an ideal torque controller design is hence to perform precise torque tracking regardless of actuator motion.

From Equation (4), the linearizing command can be computed by $$u^* = \frac{\beta D(c_l+c_{el})(p_1-p_2)P(x)-\beta Dc_{el}p_a P_1(x)+D^2\beta P(x)\omega+v}{\beta Dc_p Q(p_1,p_2,x,\text{sgn}(u^*))} \quad (8)$$

where v is the new command signal. Obviously, this control law transforms v-$\tau$ map into an integrator, i.e. $\dot{\tau}$=v. In order to implement the linearizing command law in (8) we need to express the control signal u* explicitly in terms of the measured signals $p_1$, $p_2$, x, $\omega$ and the new input signal v. However, Equation (8) does not express u* in an explicit form because u* appears in the right-hand side (RHS) of (8). This problem can be easily solved by observing the definitions of Q and $K_i$. In fact, one can infer from (2) and (7) that Q(.) depends only on the sign of u*

Therefore, by virtue of (8) and noting that scalars Q(.), $c_p$, and $\beta$ are all positive valued, we can say $$\text{sgn}(u^*)=\text{sgn}(\beta(c_l+c_{el})(p_1-p_2)P(x)-\beta Dc_{el}p_a P_1(x)+D^2\beta P(x)\omega+v)$$

which shows that u* depends only on $p_1$, $p_2$, x, $\omega$ and v. Note that the linearizing command (8) is applicable when Q$\neq$0. For $(p_1, p_2)=(p_s, p_a)$ or $(p_1, p_2)=(p_a, p_s)$, Q is zero and the actuator dynamics becomes uncontrollable from the input. The variations of $p_1$ and $p_2$ in this case, depend only on velocity.

Identification of Actuator Dynamics and Uncertainty Bounding

In this section we describe a two-stage procedure for parametric identification of actuator non-linear dynamics and for quantization of modeling uncertainty in $l_1$ topology. At the first stage of this procedure, the parameters of the non-linear model of the actuator are identified. It is assumed that the measurements of the pressure signals $p_1$, $p_2$, the velocity $\omega$, the input signal u and the position x are available; and the derivative of the torque signal $\tau$ is computed by numerical differentiation. Define $Y(p_1,p_2,x,\omega,u)=[-(p_1-p_2)P(x), -Dp_aP_1(x), -D^2P(x)\omega, DQ(.)u]$ and $\theta=[\beta(c_l+c_{el}), \beta c_{el}, \beta, \beta c_p]^T$, then equation (4) can be expressed in standard linear regression form $$\dot{\tau} = Y(p_1,p_2,x,\omega,u)\theta \quad (9)$$

The estimated parameter vector $\hat{\theta}$ is the solution to the following convex optimization problem $$\min_{\hat\theta} \left\| \dot{\tau} - Y(p_1, p_2, x, \omega, u)\hat{\theta} \right\|_p \quad (10)$$

where $\|.\|_p$ denotes signal p-norm.

However, in practice the noise caused by numerical differentiation of $\tau$ is not negligible. In order to analyze the effect of noise on the identification problem (10), let us denote $e_\tau$ as the noise introduced by numerical differentiation of $\tau$ and define $$\varepsilon = \frac{\|e_\tau\|_2}{\|\dot{\tau}\|_2}.$$

Also, define $\gamma=[Y(t_o)^T, Y(t_1)^T, \ldots, Y(t_N)^T]^T$. Let $\kappa \geq 1$ be the condition number of Y. Obviously, a large $\kappa$ indicates that the regression matrix Y is close to singularity. If (10) is considered as a least squares problem (p=2), then it can be shown that for $\varepsilon < k-1$, we have $$\|Y\tilde{\theta}\|_2 \leq 2(1+\kappa)\|e_v\|_2 + \|\tau\|_2 O(\epsilon^2) \quad (11)$$

where $\tilde{\theta} = \theta - \hat{\theta}$.

It is observed that the operator $\Delta$ enters as an additive uncertainty to the integrator system. Now, the main problem is to compute an upperbound for this operator. The proposed method consists of a new identification procedure as follows: Based on the estimated parameters $\hat{\theta}$, the linearizing control law (8) is applied while input $v$ is considered as the excitation signal. Then, by using the measured values of $\tau$ and $v$, we identify a linear discrete time model $\hat{G}$ and compute the minimum value of $\gamma$ where $\|\Delta\|_1 \leq \gamma$, such that the following uncertainty model structure $$\tau = (\hat{G} + W\Delta)v + e \quad (14)$$

is not in validated by the experimental data $\tau$ and $v$.

It is evident from this inequality that the propagation of noise to the identification problem can be minimized when $\kappa$ is close to one. Since Y is a function of input signal u, then $\kappa$ obviously depends on the choice of u. This fact suggests that the input signal has an important role in achieving the minimum possible parametric error $\tilde{\theta}$. From experimental point of view, if a set of feasible input signals is available for identification purpose, then one can choose the best input signal that minimizes $\kappa$.

Unmodeled dynamics: On the other hand, there is always a part of the actuator dynamics that are not captured by the actuator torque dynamics equation (4); this part is referred to as unmodeled dynamics. According to an embodiment of the present invention, we represent the unmodeled dynamics by a perturbation signal $d(p_1,p_2,x,\omega,u,t)$. The unmodeled dynamics can be due to the servo-valve dynamics, hysteresis in the electromagnetic circuit that derives the valve operation, deadband in control valve, delay in the servo-valve, etc. Moreover, the actuator can be affected by any perturbation that is not a function of actuator states. As shown in FIG. 1, the external torque $\tau_{ext}$ is such perturbation that affects actuator dynamics through the velocity. Therefore, the actuator torque dynamics is indeed in the form of $$\tau = Y(p_1,p_2,x,\omega,u)\theta + d(p_1,p_2,x,\omega,u,t)$$

which implies that if the identified parameters are used in the linearizing command law (8), the resulting dynamics will take the form $$\tau - v = Y(p_1,p_2,x,\omega,u)\tilde{\theta} + d(p_1,p_2,x,\omega,u,t) \quad (12)$$

The first term in the RHS of (12) refers to the parametric uncertainty. Note that the perturbation $d(p_1, p_2,x,\omega,u,t)$ is only a function of the estimated parameters (through its dependence on u) and not a function of the parametric error $\tilde{\theta}$. As a result, we consider d(.) as the non-parametric uncertainty. In the sequel we present two methods for representation of uncertainty. Clearly, there are many other representations that can deal with specific cases of parametric or nonparametric uncertainties. The choice of each representation depends on the nature of uncertainty as well as the available tools for solving the resulting identification problem. In general, uncertainty can be represented by linear fractional forms. However, the solution of the resulting model validation problem usually leads to non-convex optimizations that are not numerically tractable (e.g. when $\Delta \in bH_\infty$ one should solve a so-called $\mu$ problem)

Case A

Figure 3:
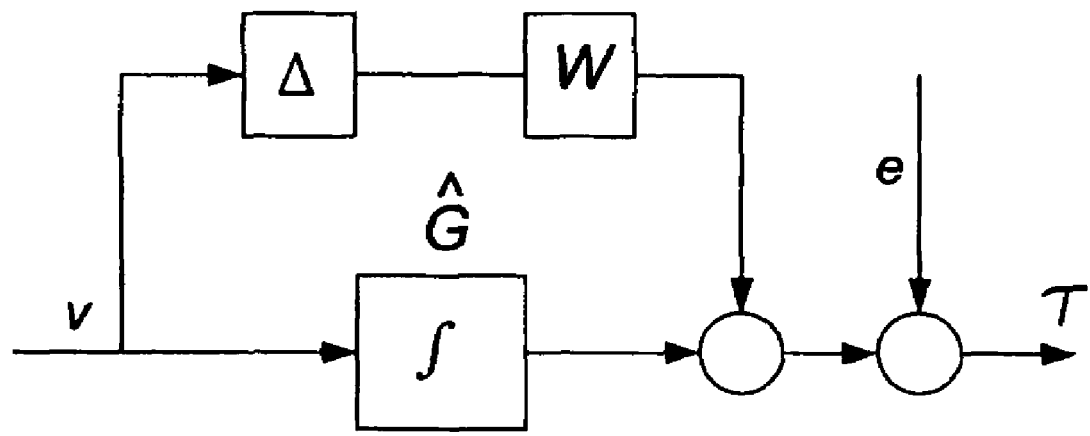
FIG. 3 is a block diagram of an uncertainty model structure according to an embodiment of the present invention.

FIG. 3 is a block diagram of an uncertainty model structure according to an embodiment of the present invention, described as Case A. In particular, FIG. 3 illustrates an additive model structure, where $\hat{G}$ is a model for an integrator.

Assume that both the parametric and non-parametric uncertainty terms are bounded and that they can be represented by $$Y(p_1, p_2, x, \omega, u)\tilde{\theta} + d(p_1, p_2, x, \omega, u, t) = \frac{d}{dt}(\Delta v + e(t))$$

where $\Delta$ is a bounded non-linear operator with $\|\Delta\|_1 \leq \gamma$ where the $l_1$ norm of an operator like $\Delta$ mapping the signal x to the signal y, is defined by $$\|\Delta\|_1 = sup_{x \neq o} \frac{\|y\|_\infty}{\|x\|_\infty}$$

with $\|x\|_\infty = sup_t |x(t)|$. Moreover, e(t) represents any perturbation that is not a function of system states. Consequently, equation (12) becomes $$\tau = (D^{-1} + \Delta)v + e(t) \quad (13)$$

where $D^{-1}$ is the integration operator.

It is observed that the operator $\Delta$ enters as an additive uncertainty to the integrator system. Now, the main problem is to compute an upperbound for this operator. The proposed method consists of a new identification procedure as follows: Based on the estimated parameters $\hat{\theta}$, the linearizing control law (8) is applied while input $v$ is considered as the excitation signal. Then,

* by using the measured values of $\tau$ and $v$, we identify a linear discrete time model $\hat{G}$ and compute the minimum value of $\gamma$ where $\|\Delta\|_1 \leq \gamma$, such that the following uncertainty model structure $$\tau = (\hat{G} + W\Delta)v + e \quad (14)$$

is not invalidated by the experimental data $\tau$ and $v$.

Here e represents sensor noise or any other external disturbance to the actuator dynamics that is independent of system states. This signal is assumed to be bounded by $$\|e\|_\infty \leq \sigma \quad (15)$$

In literature, this type of identification scheme has been recognized as model validation-based identification and it is based on the model validation concept. In the uncertainty model structure (14), W is a known weighting transfer function and the model $\hat{G}$ represents the effect of integrator term in (13).

The main reason for using the $l_1$ norm (or the induced $l_\infty$ to $l_\infty$ norm) for characterization of the uncertainty, is due to the fact that the uncertainty in the actuator dynamics has non-linear characteristic. Therefore, unlike many existing methods for bounding LTI uncertainties in $H_2$ or $H_\infty$ topologies, herein we need to use an induced operator norm for characterizing the non-linear model uncertainty. Moreover, the advantage of using $l_1$ norm over the other induced norms is that the resulting identification problem can be solved by a linear programming.

For model G in form of a rational transfer function $\hat{G}(q^{-1}) = B(q^{-1})/A(q^{-1})$, where $q^{-1}$ is a unit delay operator, the formulated identification problem is tantamount to solving a non-convex optimization problem. An iterative algorithm known in the art can then be used to solve the problem. Here it is assumed that the model $\hat{G}$ is expressed in terms of the orthonormal basis functions as $$\hat{G}(q^{-1}) = \sum_{k=0}^{n} \hat{l}_k F_k(q^{-1}) \quad (16)$$

where $F_k(q^{-1})$ is the k-th known orthonormal basis and $l_k$s are the parameters to be identified.

With this model description, the parameters appear linearly and the resulting optimization will be convex. The ongoing analysis shows that the stated identification problem can be solved via linear programming. Let $l=[l_0, \ldots, l_n]^T$ be the vector of parameters and $T_\tau$ represent the first n columns of a lower triangular Toeplitz matrix constructed from $[\tau(0), \ldots, \tau(N)^T]$. Moreover, $\overline{F}$ is a $(N+1) \times n$ matrix whose k-th column is the first N+1 samples of the impulse response of the basis function $F_k$. Similarly, $T_W$ is a $(N-1) \times (N-1)$ lower triangular Toeplitz matrix that is constructed from the first samples of the impulse response of the known weighting function W.

Proposition 1 Suppose that N+1 samples of the experimental data v and τ are available ($v_N$ and $\tau_N$) and a bound on the noise signal e as (15) is available. Then the following linear programming problem identifies the parameters of the model $\hat{G}$ and computes the value of the smallest γ with $\|\Delta\|_1 \leq \gamma$ such that the model structure (1.4) is not invalidated by the given experimental data:

$$\min \gamma \quad (17)$$
$$\text{subject to:} \quad \hat{l}, e_N, \gamma$$
$$|T_W^{-1}(\tau_N - e_N - T_v \overline{F} \hat{l})| \leq \gamma E_v$$
$$|e_N| \leq \sigma \underline{1} \quad (18)$$

In the above optimization problem, the parameter vector $\hat{l}$, the noise vector $e_N$ and the scalar γ are the optimization variables and $\underline{1}$ is a vector of dimension N+1 with unit elements. Moreover, the k-th element of the vector function $E_v = [E_v(0), \ldots, E_v(N)]^T$ is defined by $$E_V(k) = \max_{0 \leq i \leq k \leq N} |v(i)| \quad (19)$$

It is worthwhile to note that in the above proposition, the value of γ is an upperbound for the additive model uncertainty with respect to the given set of experimental data. Finding an upperbound for the additive modeling error for all possible experimental data, known in the literature as the so-called worst-case uncertainty bounding, has been the subject of many researches in the past several years, particularly for case of LTI uncertainties. However, the problem of computing a worst-case upperbound for non-linear uncertainties still remains an open issue.

Case B1: When Only β is Unknown and Load Dynamics is Stable

Figure 4:
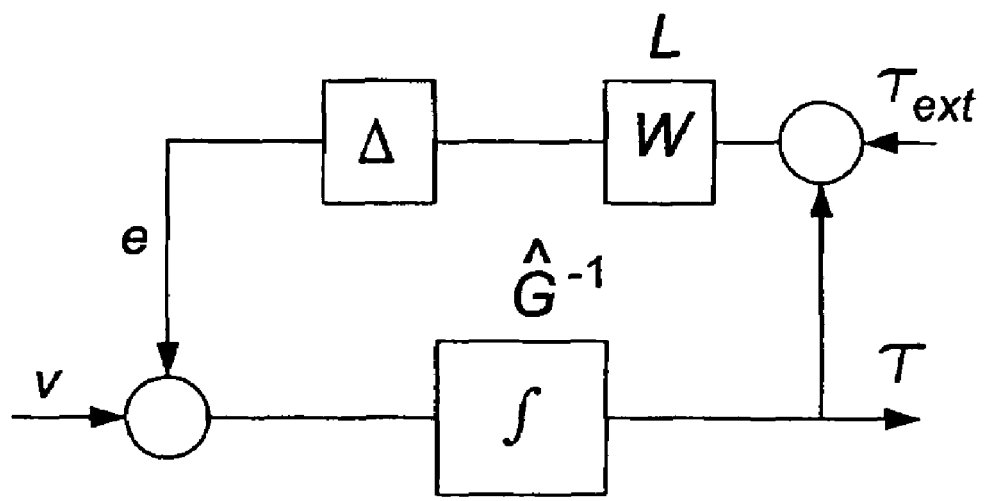
FIG. 4 is a block diagram of an uncertainty model structure according to another embodiment of the present invention.

FIG. 4 is a block diagram of an uncertainty model structure according to another embodiment of the present invention, referred to as Case B1. In particular, FIG. 4 illustrates a model structure for representation of uncertainty in bulk modulus coefficient when load dynamics are stable. $\hat{G}^{-1}$ is a model for an integrator.

As mentioned previously, the model structure (14) is a special case for representing the uncertainty in actuator dynamics. To demonstrate another example, let us consider the case when the only source of parametric uncertainty is the error in bulk modulus coefficient β. This error indicates that the effect of velocity has not been perfectly eliminated by the linearizing controller. Applying the linearizing command signal u* with nominal $\hat{\beta}$ implies that $$\tau - v = \tilde{\beta} D^2 P(x) \omega$$

Now let the mapping from $\tau + \tau_{ext}$ to ω to w be expressed by $\omega = \mathsf{L}(\tau + \tau_{ext})$ where $\tau_{ext}$ represents any external torque and $\mathsf{L}$ is an operator representing load dynamics. Define the uncertain block as $\Delta = D^2 P(x) \tilde{\beta}$, then $$\tau = v + \Delta \mathsf{L}\tau + \Delta \mathsf{L}\tau_{ext} \quad (20)$$

Note that Δ is still a non-linear operator due to the presence of P(x). As it can be seen from FIG. 4, the uncertainty in this case appears in a feedback connection with an integrator. If load dynamics is unknown, $\mathsf{L}$ should be contained in Δ. But, in the sequel we assume $\mathsf{L}$ is known. In this case the transfer function associated with $\mathsf{L}$ (i.e. L(s)) plays the role of a weighting function as W does in (14). Given N+1 samples of v and τ, the following model structure is then used for identification of the model $\hat{G}$, and an upperbound, γ for the uncertainty Δ, where $\|\Delta\|_1 \leq \gamma$:

$$\hat{G}\tau = v + \Delta W \tau + e \quad (21)$$

where $e = \Delta L \tau_{ext}$ represents the effect of external disturbance to actuator dynamics resulting from external torque $\tau_{ext}$. Obviously, $$\|e\|_\infty \leq \|\Delta\|_1 \|L\|_1 \|\tau_{ext}\|_\infty = \gamma \|L\|_1 \|\tau_{ext}\|_\infty$$

Note that here $\hat{G}$ stands for the derivative operator (rather than integrator operator in model structure (14)). Moreover, we assume that a bound on both $\|L\|_1$ and $\|\tau_{ext}\|_\infty$ are known. With the same argument as in proof of Proposition 1, one can show that the following linear programming problem solves the identification problem $$\min \gamma$$
$$\text{subject to:} \quad \hat{l}, \gamma$$
$$|T\tau \overline{F} \hat{l} - v_N| \leq \gamma \|L\|_1 (E_\tau + \|\tau_{ext}\|_\infty \underline{1})$$

Case B2: When Only β is Unknown and Load Dynamics are Unstable

Equation (20) can be written as $$\mathsf{L}^{-1}\tau = \mathsf{L}^{-1}v + \Delta\tau + \Delta\tau_{ext} \quad (22)$$

The following model structure is then proposed $$\hat{G}_1 \tau = \hat{G}_2 v + \Delta\tau + e \quad (23)$$

where $\hat{G}_1$ represents a model for sL(s) and $\hat{G}_2$ is a model for $L(s)^{-1}$. Obviously, $\hat{G}_1$ and $\hat{G}_2$ include load dynamics and hence, load dynamics is considered unknown. Similarly, e represents the term $\Delta\tau_{ext}$ and it is bounded by $\|e\|_\infty \leq \|\Delta\|_1 \|\tau_{ext}\|_\infty = \gamma \|\tau_{ext}\|_\infty$.

The models $\hat{G}_1$ and $\hat{G}_2$ are parameterized as in (16) with parameter vectors $l_1$ and $l_2$, respectively. Therefore, given N+1 samples of v, τ together with knowledge of $\|\tau_{ext}\|_\infty$, the identification problem is to find $\hat{l}_1$ and $\hat{l}_2$ and minimum value of γ such that the model structure (23) is not invalidated by data. The following linear programming can be similarly shown to solve the identification problem $$\min \gamma$$

subject to: $\hat{l}_1, \hat{l}_2, \gamma$ $$\left|T_\tau F_1 \hat{l}_1 - T_v \overline{F}_2 \hat{l}_2\right| \leq \gamma(E_\tau + \|\tau_{ext}\|_\infty 1)$$

Remark 1 It is possible that the parametric and non-parametric uncertainties that are represented by $\Delta$ are time-varying. In other words, if $\theta$ varies with time then $\theta$ will be also time-dependent. All previous identification results are still valid in this case. However, it should be noted that when parameter variation is very significant (and assuming that the overall identification procedure is long enough to capture the variation of $\theta$), the estimated bound for $\Delta$ can be large. This means that the robust external controller designed based on this large upperbound will be conservative. Apart from an adaptive approach, one way to resolve this problem is to repeat the identification-controller design in some time intervals. Clearly, these time intervals should be long enough to let the identification and controller design procedure be completed while, on the other hand, short enough to be capable of following parameter variations. Such a repetitive identification-robust control design has been used in literature for slow-varying systems. In our particular case the preferable minimum time interval turns to be about 2 minutes. However, our implicit assumption is that the actuator operates in steady state and parameters do not vary significantly.

External Optimal $l_1$-$H_\infty$ Controller Design

The nominal model $\hat{G}$ together with the uncertainty upperbound $\gamma$ can be used in a robust control strategy for designing the external linear discrete-time controller C that maps the torque error signal $\tilde{\tau}$ to the new input signal v. In the sequel, we specify different robust stability and performance conditions for the entire closed-loop system according to three model structures (14), (21) and (23).

Case A

The nominal output sensitivity function can be defined as $S=(1+GC)^{-1}$ and the nominal input sensitivity function can be defined as $S_u=CS$. The additive uncertain structure (14) induces a robust stability condition on the nominal input sensitivity function $$\|WS_u\|_1 < \gamma^{-1} \quad (24)$$

Moreover, in order to attenuate the effect of high frequency sensor noise on the input signal v, and to limit the amplitude of the input signal v, an $H_\infty$ constraint should be imposed on the input sensitivity function $$\|W_n S_u\|_\infty \leq \delta_n \quad (25)$$

$$\min_C \|S(\hat{G}, C)\|_1 \quad (26)$$

For the feedback loop shown in FIG. 1, the torque tracking error $\tilde{\tau}=\tau_{ref}-\tau 0$ and the reference signal $\tau_{ref}$ are related to the output sensitivity function by $\tilde{\tau}=S\tau_{ref}$. A presently desirable performance objective is to minimize the maximum (over all possible reference signals) peak-to-peak torque tracking error. This is equivalent to minimize the $l_{-1}$ norm or the induced $I_\infty$ norm of the output sensitivity function.

Since $H_2$ and $H_\infty$ norm of any LTI system are bounded by its $l_1$ norm, this performance objective obviously minimizes an upperbound for the $H_2$ and $H_\infty$ norm of the output sensitivity function. This is a property that no optimal $H_2$ or $H_\infty$ controller possesses. The minimization of $\|S\|_1$ also minimizes the effect of external disturbance e in $\tau$, however one should note that due to the presence of non-linear operator $\Delta$ in model structure (14), a bounded disturbance can destabilize the system depending on initial conditions and nature of non-linearity. Therefore, one should keep in mind that the effect of external disturbance is minimized as long as initial conditions are sufficiently close to system equilibrium point.

Case B1

Given the model structure (21), the robust stability condition becomes $$\left\|W\frac{\hat{G}^{-1}}{1+\hat{G}^{-1}C}\right\| < \gamma^{-1} \quad (27)$$

Recalling that W=L it becomes clear that for the loads with high flexibility, the frequency response of $W(j\omega)$ is large in some resonant frequencies. Therefore, constraint (27) requires that the closed loop sensitivity function $$\frac{\hat{G}^{-1}}{1+G^{-1}C}$$

be small in load resonance frequencies. This implies that when the effect of velocity is not perfectly eliminated by the linearizing controller, a limitation is imposed on the achievable performance through a robust stability constraint. This result is in accordance with known analysis describing the limitation effects of lightly damped modes of load on the achievable performance of force controllers. It is worthwhile to notice that these lightly damped modes affect the performance of our proposed controller only when the effect of velocity is not perfectly compensated. However, these modes limit the performance of typical PID force controllers even in absence of uncertainty in actuator dynamics, due to particular structure of these controllers.

In order to minimize the amplitude of tracking error, the same performance objective as in (26) can be considered herein. Note that here in definition of all sensitivity functions $S, S_u$, one should replace $\hat{G}$ by $\hat{G}^{-1}$.

Case B2

Similar to case A and case B1, model structure (23), induces a robust stability constraint such as $$\left\|\frac{1}{\hat{G}_1+\hat{G}_2C}\right\|_\infty < \gamma^{-1}$$

on the external controller C. Note that since $G_1$ represents $sL(s)$ and $L(s)$ is unstable, the transfer function $$\frac{\hat{G}^{-1}}{1+G^{-1}C}$$

is non-minimum phase and this fact can impose some limitations on the achievable performance of torque controller.

Limit-Cycle

When the gain of external controller is high, a self exciting oscillation (limit-cycle) is observed in the generated torque.

Figure 7:
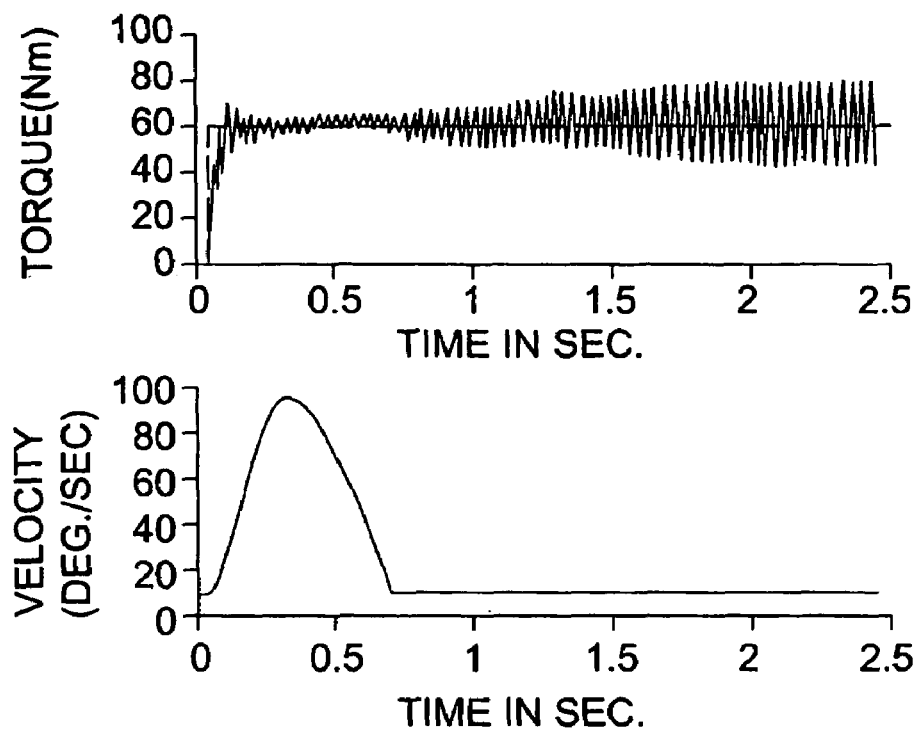
FIG. 7 graphically illustrates a limit cycle in actuator dynamics in the presence of a high gain external controller.

FIG. 7 graphically illustrates a limit cycle in actuator dynamics in the presence of a high gain external controller. According to experimental results, the frequency of the main harmonic of the limit-cycle can range from 200 to 400 rad/sec depending on controller gain. Moreover, the frequency is almost independent of load inertia. As seen in FIG. 7, the oscillations start when velocity approaches zero, suggesting that the oscillations may be caused by static friction. The valve dead-zone can be also a cause because its effect is dominant near zero velocity that corresponds to low flow and small valve opening. Moreover, the occurrence of limit-cycle depends also on reference torque. For example, for high frequency sinusoidal reference signals (higher than 1 Hz), the oscillations do not normally occur. The existence of limit-cycle phenomenon has been reported and it has been attributed to the existence of electromagnetic hysteresis in the valve dynamics. It has been shown that the oscillations can be caused by lightly damped modes of load dynamics.

If limit-cycle is considered to be caused only by load dynamics, its effect is injected into torque dynamics (4) through the velocity signal $\omega$. The effect of velocity can then be perfectly compensated by the linearizing controller in absence of uncertainty and especially in absence of parametric error in bulk modulus $\beta$. However, when $\beta$ is not zero, a constraint like (27) should be imposed to ensure robust stability with an acceptable level of oscillation attenuation. On the other hand, if limit-cycle originates from actuator dynamics, its effect can be represented by an uncertainty term as in model structure (14). A constraint like (24) can then ensure the stability robustness together with a level of performance. Another efficient way to attenuate the oscillations is to impose point-wise constraints on the input sensitivity function $S_u$ (as defined in case A) in the frequency ranges where the oscillations occur. These constraints aim to cancel out the effect of the main harmonics of the limit-cycle by preventing them to be injected into the system through $v$. We describe these constraints by $$|S_u(j\omega_\kappa)| \leq \delta_\kappa, \text{ for } \kappa=1, \ldots m \quad (28)$$

In any case, the existence of limit-cycle obviously limits the achievable performance of the torque controller.

Synthesis

From a synthesis point of view, there are more constraints that should de imposed on the output sensitivity function S. For example, if the nominal model $\hat{G}$ has any unstable pole-zeros or pure delays, the complementary sensitivity function 1-S should also contain exactly the same dynamics in order to avoid any unstable pole-zero simplification between the controller and the model. These constraints are usually referred to as zero interpolation conditions, and they are transformed into LP constraints.

A synthesis procedure according to an embodiment of the present invention for designing the external controller C is based on the formulation of convex Linear Matrix Inequality (LMI) or Linear Programming (LP) constraints for each of the control design specifications (24)-(26). In general, these constraints are infinite-dimensional but in many cases they can be reduced to finite-dimensional optimization. For example, it is known that in SISO case, a pure $l$ minimization in (26) has an Finite Impulse Response solution for S. Moreover, the minimization problem (26) together with (28) has typically an FIR solution for S. However, by imposing all the control specifications (24)-(25), the optimal solution for S can be no longer FIR. One way to check this property is to approximate all infinite-dimensional constraints by finite-dimensional ones via finitely many variables and finitely many equations methods. Here in our problem, we considered an FIR structure for the output sensitivity function S. The interpolation conditions as well as the control specifications (24) and (26) are consequently transformed into LP constraints. Furthermore, by the application of Bounded Real Lemma, the $H_\infty$ constraint (25) is transformed into an LMI constraint. Also, the point-wise constraints in (28) are transformed into an LMI by using methods known in the art.

Experimental Results

The experimental tests have been conducted on the pitch actuator of the Titan II Schilling industrial robot which is located at the robotics laboratory of the Canadian Space Agency. In a particular experimental result, the joint is driven by a vane type rotary hydraulic actuator that generates a nominal torque of 500 Nm at nominal supply pressure of 3000 Psi. The position angle of the actuator can vary between $-90°$ to $+90°$ and it is measured by a 16-bit encoder. The maximum velocity of the actuator is 192°/sec. The chamber pressure $p_1$ and $p_2$ are measured by two pressure transducers. All analog signals are sampled at 1 kHz.

Identification and Uncertainty Bounding

The parameters of the actuator non-linear model are estimated via a typical least-squares optimization (10) using 1000 time-domain data samples. The identified parameters $\hat{c}_p$, $\hat{c}_l+\hat{c}_{el}$ and $\hat{\beta}$ of the non-linear model are shown in Table 1.

TABLE 1

| $V_0$ | D | $\hat{c}_p$ | $\hat{c}_l + \hat{c}_{el}$ | $\hat{\beta}$ |
|---|---|---|---|---|
| $1.67 \times 10^{-4}$ | $2.66 \times 10^{-5}$ | $1.49 \times 10^{-4}$ | $1.11 \times 10^{-7}$ | $1.44 \times 10^4$ |

The identification procedure typically needs computation of $\tau$ through numerical differentiation. In order to decrease noise amplification during differentiation, we decimated $\tau$ with a factor of 5 before differentiation. As discussed earlier, the choice of input signal u has a strong impact on the condition number of the regression matrix $\gamma$ which in its turn can affect the parametric error. It is known that for persistently exciting input signals with wide frequency bandwidth, this condition number is close to one and consequently the parametric error is reduced. However, when such persistent input signals are applied in a hydraulic actuator they can cause sharp variation of torque signal $\tau$, which can complicate the numerical differentiation of $\tau$ needed for identification purpose. So it seems that there is a compromise between the degree of persistency of input signal and the degree of difficulty in numerical differentiation of $\tau$.

Figure 5:
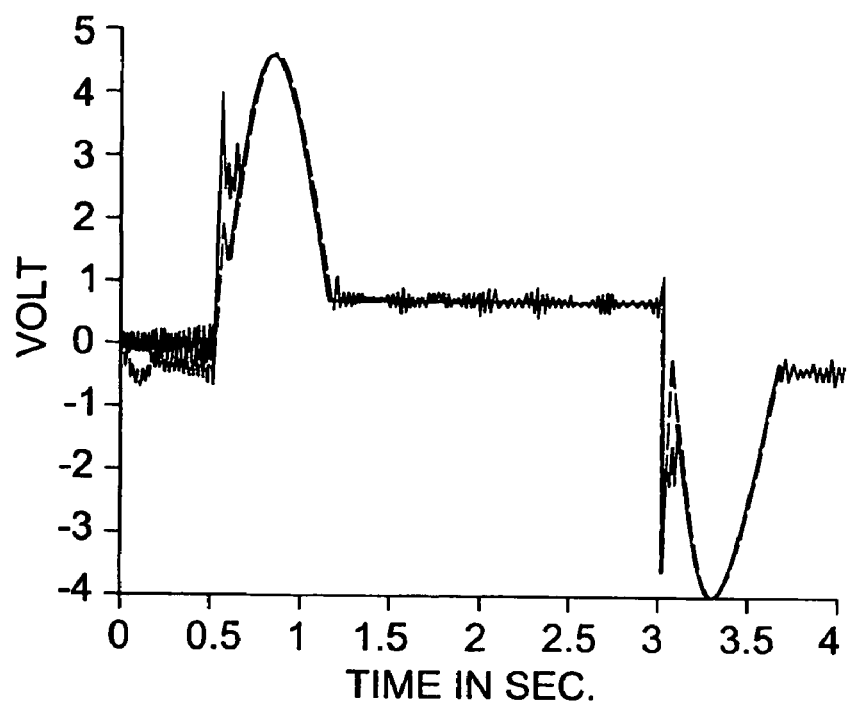
FIG. 5 graphically illustrates a validation of a non-linear model according to an embodiment of the present invention.

After identification of actuator parameters and in order to validate the non-linear model, we computed the estimated input signal $\hat{u}$ from equation (4) using the identified parameters and the measured signals $\tau, p_1, p_2, \omega$ and x. The estimated input $\hat{u}$ was compared with the measured input signal u. FIG. 5 graphically illustrates a validation of a non-linear model according to an embodiment of the present invention, which shows a satisfactory match between u and $\hat{u}$ in low frequencies. Taking u as input and $\tau$ as output to actuator dynamics, this comparison is in fact a measure of matching between the true and the identified inverse non-linear dynamics of the actuator.

Figure 6:
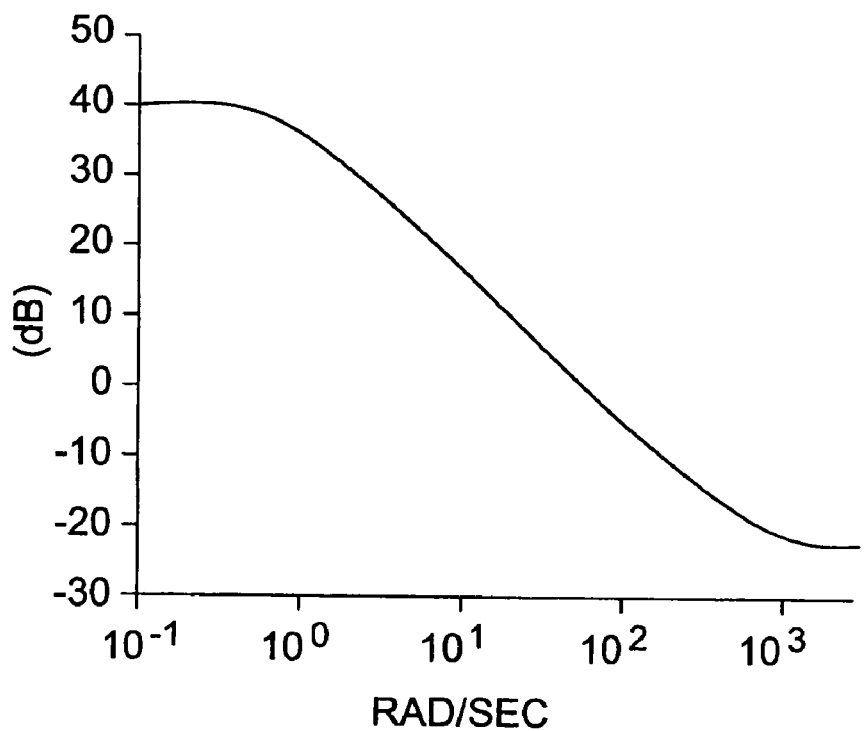
FIG. 6 graphically illustrates a frequency response of a linearized model represented by an uncertainty model structure according to an embodiment of the present invention.

Ideally, the identified parameters, which are used to compute the feedback linearization control law (8), results in an integrator system mapping the new input v to actuator torque $\tau$. In practice, however, the mapping deviates from an integrator due to unmodeled dynamics. Using model structure (14) we identified the nominal model $\hat{G}$, assuming W=1, $$\hat{G}(q^{-1}) = q^{-2} \frac{0.1313 - 0.0603q^{-1}}{1 - 0.994q^{-1}}$$

via the identification procedure described earlier. The frequency response of $\hat{G}$ is shown in FIG. 6, graphically illustrates a frequency response of a linearized model represented by an uncertainty model structure according to an embodiment of the present invention. It is evident from the figure that $\hat{G}$ behaves as an integrator within frequency range of 0.17 and 170 Hz. For the given data, the upperbound of the additive uncertainty is calculated to be $\|\Delta\|_1 \leq 0.16$.

Optimal $l_1$-$H_\infty$ Robust Control Design

The synthesis of C is based on models structure (14) and constraints presented in section 5.1. Since the $l_1$ norm of the additive non-linear uncertainty is bounded by 0.16, we must have $\|S_u\|_1 < 0.16^{-1} = 6.25$ to maintain robust stability. Moreover, in order to attenuate the effect of the noise on the new input signal v, we specify high pass filter $W_n$ as weighting function in constraint (25)

$$W_n(q^{-1}) = \frac{1 - 0.99q^{-1}}{5.22 - 4.23q^{-1}}$$

Note that in SISO case the constraint (25) is equivalent to bound $|S_u(j\omega)| |by| W_n^{-1}(j\omega)|$ As discussed previously, the system may exhibit limit-cycle if high gain linear controller is used. FIG. 7 shows this phenomena when the linear controller is simply a proportional gain (C=K=2). The frequency range of the principal harmonic of the limit-cycle for different values of K is between 200 and 400 rad/sec. In order to attenuate the limit-cycle oscillation, we imposed two point-wise constraints on the input sensitivity function in 200 and 400 rad/sec. with $\delta_1 = \delta_2 = 6$ dB, as stated in (28).

The controller synthesized based on all these design specifications is a 21th order discrete-time transfer function. The optimal controller gives an output sensitivity function with $\|S\|_1 = 2.04$ which implies that the amplitude of tracking error for any reference signal with $\|\tau_{ref}\|_\infty \leq 1$ does not exceed 2.04.

Note that the complexity of external controller is a natural consequence of imposing several robust stability and performance constraints. For example, in case of pointwise constraints (28), the controller needs to include narrow-band behavior in two different frequencies and consequently its order becomes high. Moreover, unlike $H_\infty$ control, in $l_1$ case, no direct relationship exists between the order of optimal controller and that of the model. This means that the order of optimal $l_1$ controllers can be arbitrarily high regardless of model order. However, in $H_\infty$ or $H_2$ case, the controller order is bounded by order of model and weighting functions.

From implementation point of view, since the resulting controller is designed in discrete-time domain, its implementation does not need any continuous-to-discrete transformation. Although in none of our experiments we had an implementation problem due to complexity of C, standard model-reduction techniques can be applied provided that the reduced order controller does not violate key stability and performance criteria.

Performance Evaluation

Figure 8:
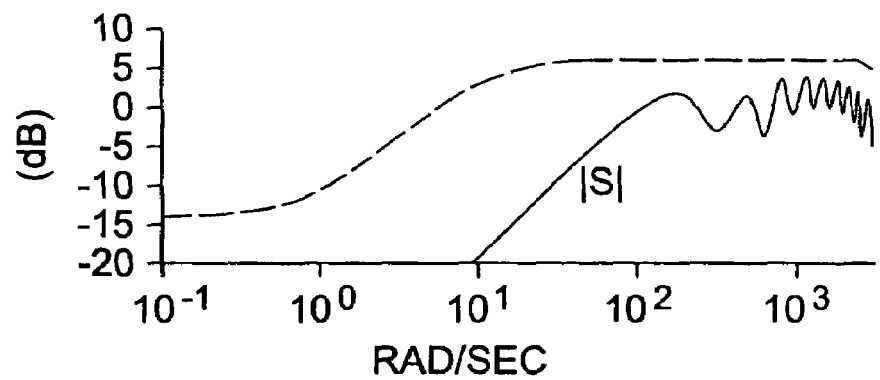
FIG. 8 graphically illustrates frequency responses of resulting input and output sensitivity functions together with weighing functions.
Figure 8:
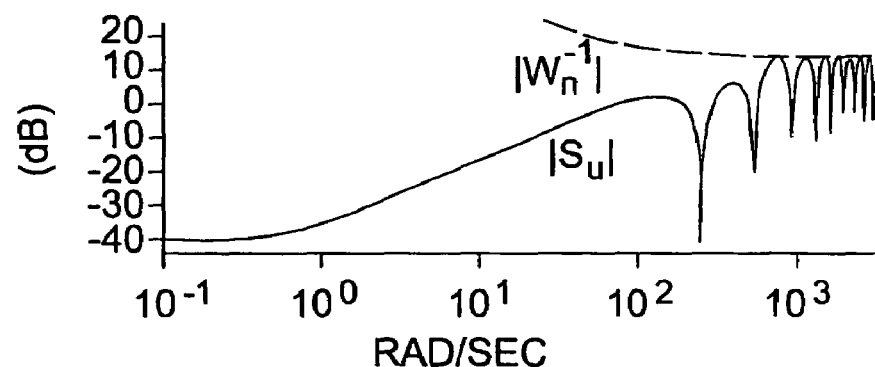
Figure 9:
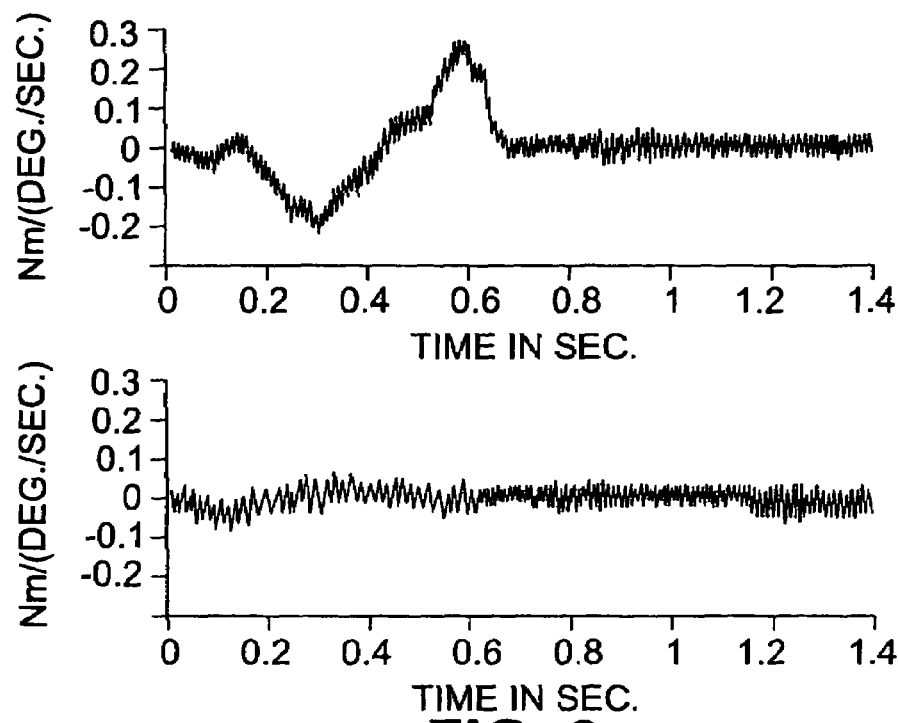
FIG. 9 graphically illustrates an effect of external torque disturbance on generated torque.

In order to demonstrate back-drivability (equivalently low sensitivity of the controlled actuator to velocity and external torque perturbations), we conducted an experiment in presence of two types of controllers. FIG. 8 graphically illustrates frequency responses of resulting input and output sensitivity functions together with weighing functions. FIG. 9 graphically illustrates an effect of external torque disturbance on generated torque, specifically the response of the hydraulic torque to external torque disturbance with and without having inner feedback linearization loop, respectively.

During the experiment, the end-effector of the robot was moved by hand while controllers were regulating the torque of pitch actuator to zero. It is evident from the figures that the sensitivity of the control system to external torque disturbance is substantially reduced when the feedback linearization is used. Let us define backdrivability index of an actuator as the ratio of torque amplitude to velocity amplitude when $\tau_{ref} = 0$ and when actuator is subject to external torques $$\eta = \frac{\|\tau\|_\infty}{\|\omega\|_\infty} \bigg|_{\tau_{ref}=0, \tau_{ext} \neq 0}$$

Obviously, for an ideal source of torque $\eta = 0$. This index is also a measure of impedance of actuator. Without feedback linearization inner loop (a), the backdrivability index is 27 but for the proposed cascade controller (b), this quantity decreases to 7.9. Low sensitivity to external torque disturbance in case (b) implies that the hydraulic system is backdrivable and performance of torque controller is not much affected by load variations or external torques.

Figure 10:
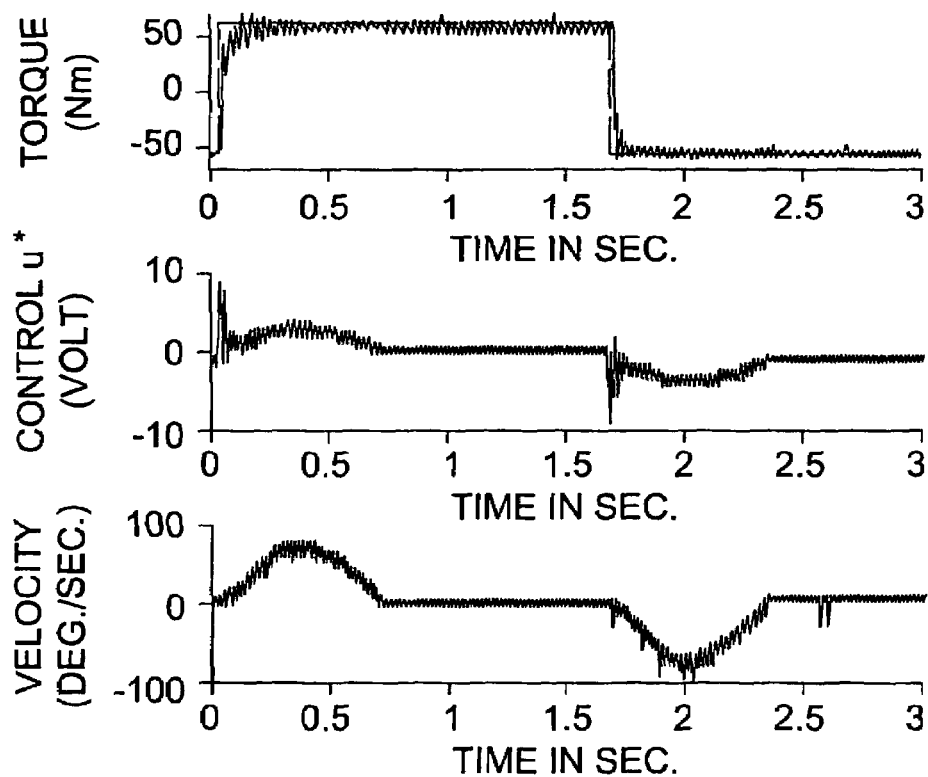
FIG. 10 graphically illustrates step tracking of actuator torque in the presence of velocity.

FIG. 10 shows the step response of the proposed controller, also described as step tracking of actuator torque in the presence of velocity. The rise-times and the settling times of the control system as well as sensitivity to velocity disturbance are reported in Table 2:

TABLE 2

| $t_r^+$ | $t_r^-$ | $t_s^+$ | $t_s^-$ | $\eta$ |
|---|---|---|---|---|
| 22 ms | 21 ms | 200 ms | 100 ms | 7.9 |

Figure 11:
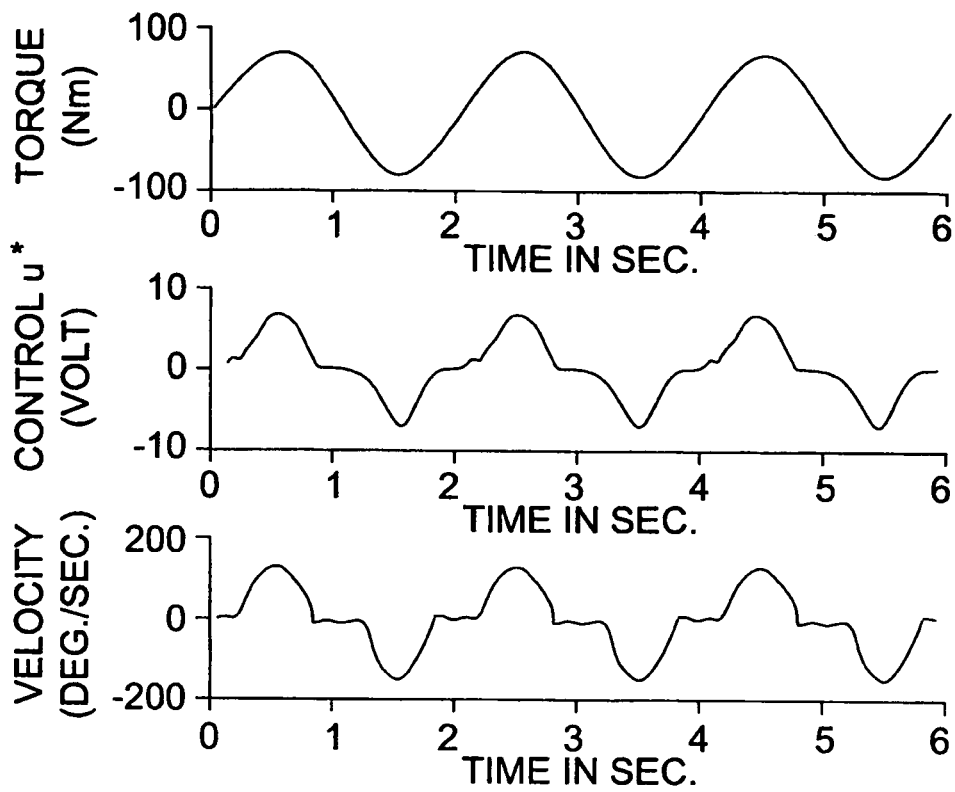
FIG. 11 graphically illustrates 0.5 Hz sine tracking of actuator torque in presence of velocity.
Figure 12:
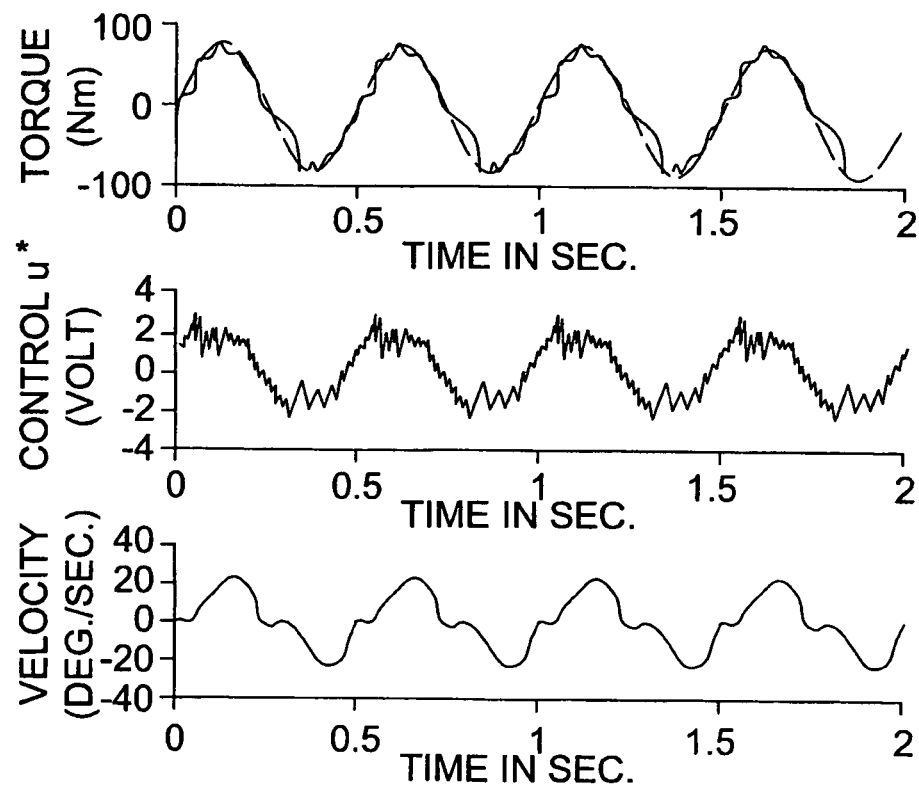
FIG. 12 graphically illustrates 2 Hz sine tracking of actuator torque in presence of velocity.
Figure 13:
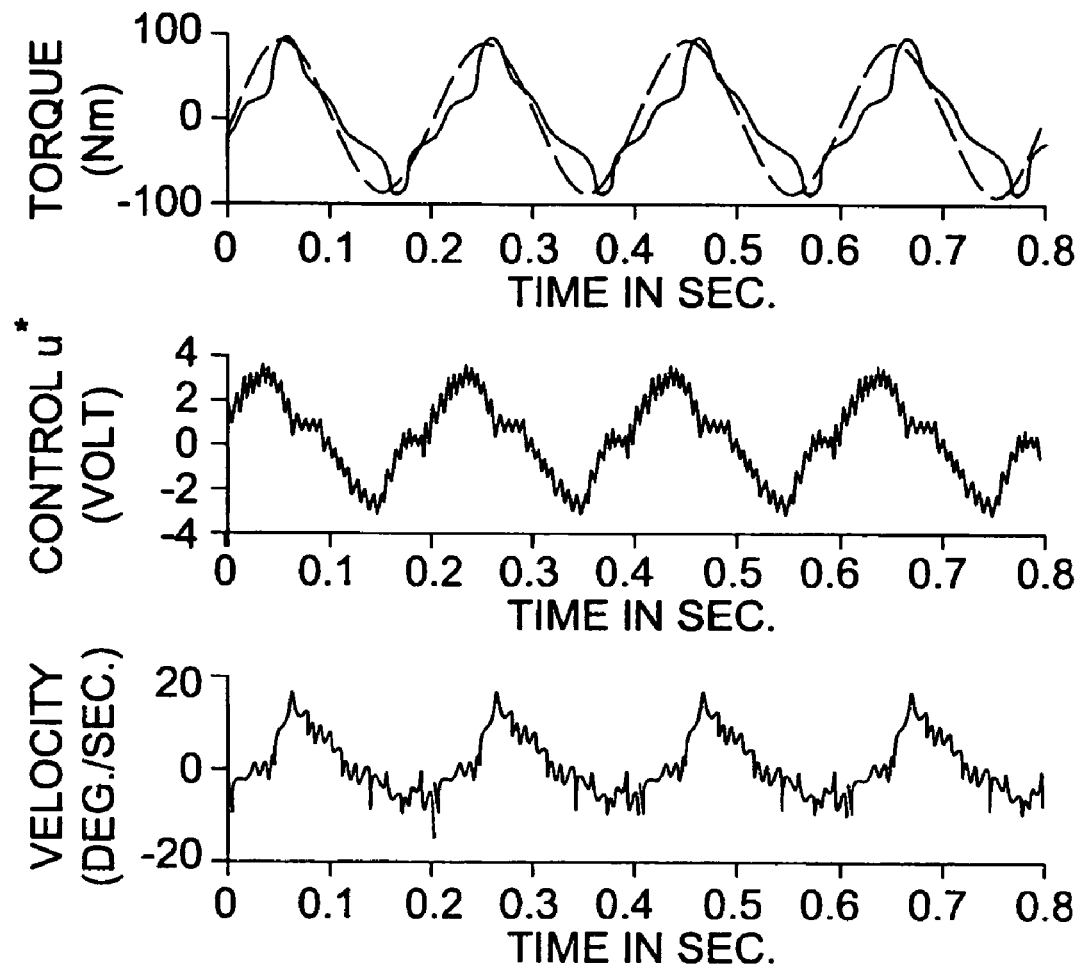
FIG. 13 graphically illustrates 5 Hz sine tracking of actuator torque in presence of velocity.

FIGS. 11, 12 and 13 show the sinusoidal reference tracking for different frequencies and in presence of velocity disturbance. Specifically, the figures illustrate 0.5 Hz, 2 Hz, and 5 Hz sine tracking, respectively, of actuator torque in presence of velocity. Note that because of the smoothness of sinusoids, the limit-cycle phenomenon might not be observed for high-gain controllers.

In many robotics applications such as contact force control, the hydraulic actuators motion is negligible. Therefore, the distortion caused by velocity in the generating torque is reduced. In order to check the performance of the designed controller in absence of velocity, we conducted the previous experiments when robot end-effector was locked.

Comparison of Step Response of System

Figure 14:
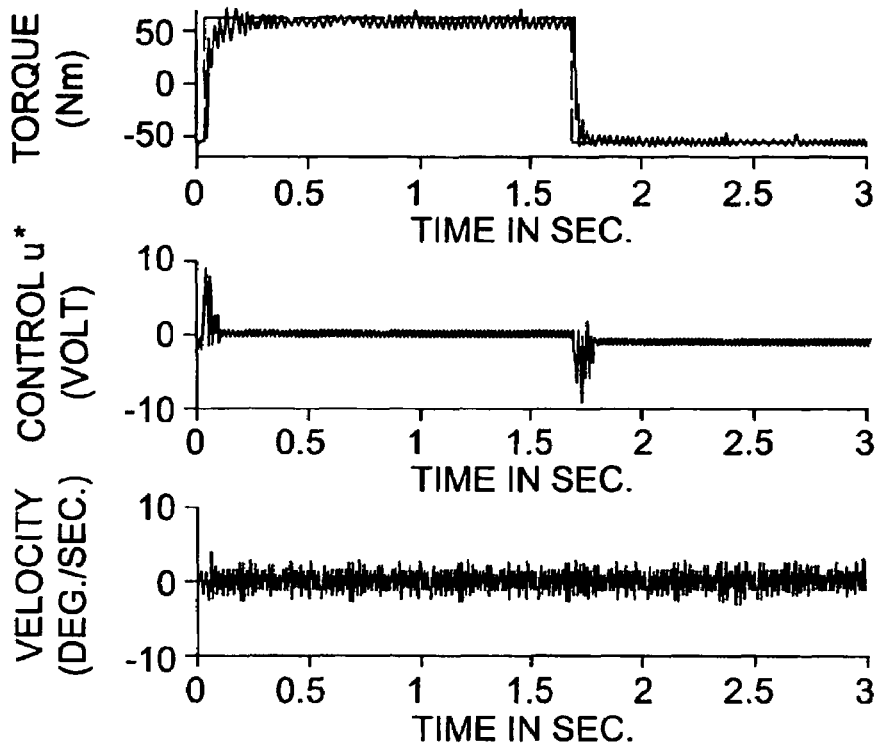
FIG. 14 graphically illustrates step response of actuator torque in absence of velocity.
Figure 15:
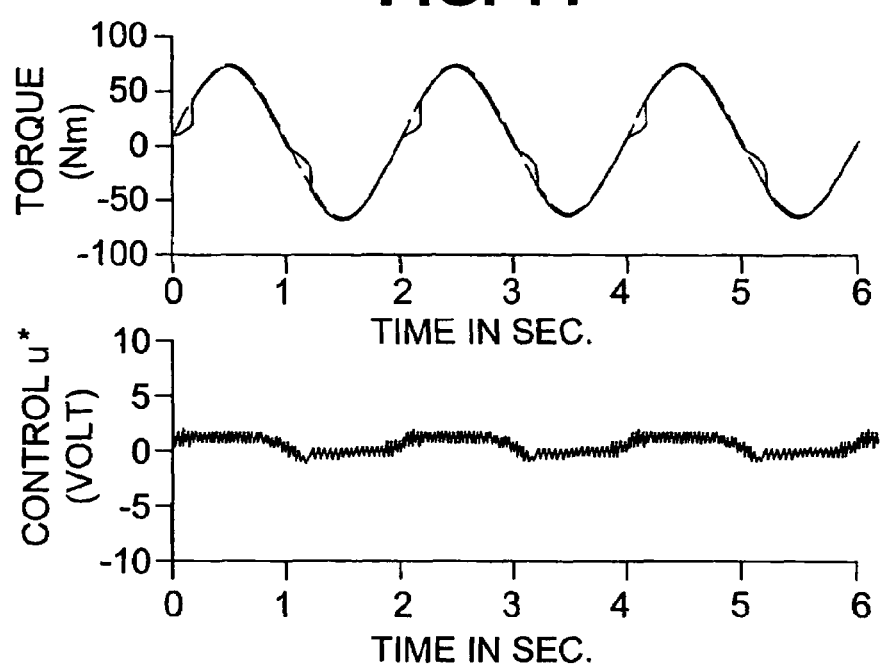
FIG. 15 graphically illustrates 0.5 Hz sine tracking of actuator torque in absence of velocity.
Figure 16:
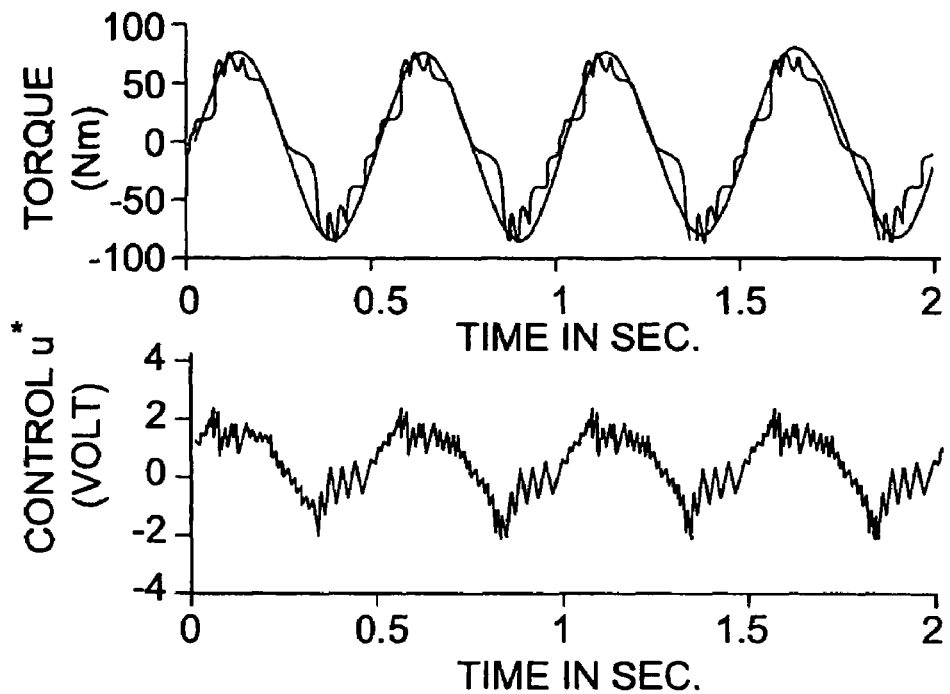
FIG. 16 graphically illustrates 2 Hz sine tracking of actuator torque in absence of velocity.
Figure 17:
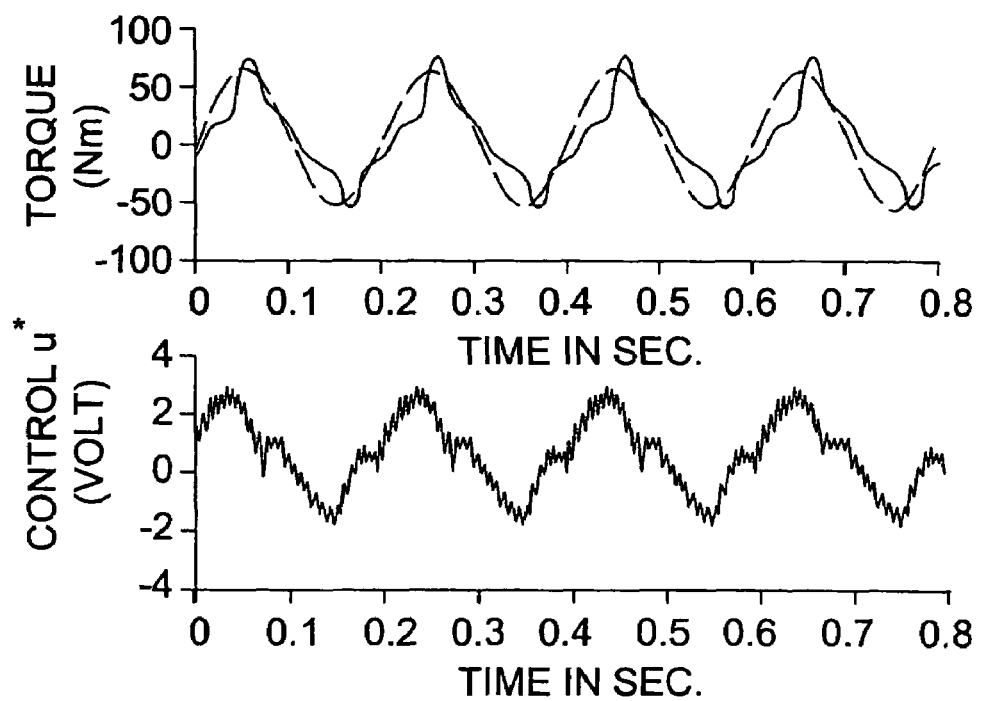
FIG. 17 graphically illustrates 5 Hz sine tracking of actuator torque in absence of velocity.

In presence and in absence of velocity in FIG. 10 and FIG. 14, shows a slight improvement in performance of controller in absence of velocity. FIG. 14 graphically illustrates step response of actuator torque in absence of velocity, while FIGS. 15-17 graphically illustrate 0.5 Hz, 2 Hz, and 5 Hz sine tracking, respectively, of actuator torque in absence of velocity. Obviously, if the effect of velocity is well compensated by the linearizing controller one should not expect a significant difference between the performance of composite controller in static and non-static case. The tracking performance of controller with respect to sinusoidal reference inputs with and without presence of velocity disturbance are illustrated in FIGS. 11, 12, 13 and FIGS. 15, 16, 17, respectively.

Conclusion

A novel combined scheme for identification and robust torque control of rotary hydraulic actuators has been presented. The feedback linearization loop has been used to linearize the actuator dynamics and to compensate for non-linear effect of velocity disturbance, while the outer $l_1$-$H_\infty$ optimally loop has been implemented to ensure best degree of achievable robustness and performance for the system in the face of possible uncompensated non-linearities. The stability analysis of the internal dynamics provides some necessary results that could be considered in developing new methods for design of the torque controllers achieving global stability. The experimental results described herein illustrate the implementability and efficiency of the proposed combined scheme.

As will be understood by those of skill in the art, the methods of design, methods and systems relating to torque/force controller embodiments of the present invention can be generally embodied as software residing on a general purpose, or other suitable, computer having a modem or internet connection to a desired optical network. The application software embodying methods of design, methods and/or systems relating to torque/force controller embodiments of the present invention can be provided on any suitable computer-useable medium for execution by the computer, such as CD-ROM, hard disk, read-only memory, or random access memory, or as part of any carrier signal or carrier wave. In a presently preferred embodiment, the application software is written in a suitable programming language, such as C++ or Matlab/Simulink, and is organized, as described above, into a plurality of modules or elements that perform the method steps described. The methods could be implemented in a digital signal processor (DSP) or other similar hardware-related implementation. When reference is made to a means for performing steps of methods according to an embodiment of the present invention, such means are to be understood to include computer-readable means as described above.

Therefore, according to an aspect as described above, the present invention provides a computer-readable storage medium, comprising computer instructions for: calculating a linearizing control law based on identified parameters of an actuator non-linear model; determining an uncertainty model for the actuator, the uncertainty model including a non-linear component; estimating an uncertainty bound based on the identified parameters; and designing an external linear controller based on the calculated linearizing control law, the determined uncertainty model, and the estimated uncertainty bound.

Although embodiments of the present invention have primarily been described in conjunction with a torque/force controller, it is to be understood that such a controller can be provided separately, or can be provided integrally with an actuator. For instance, a manufacturer or reseller of hydraulic actuators could include a torque/force controller according to an embodiment of the present invention integral with the hydraulic actuator. As such, in an aspect, there is provided a hydraulic actuator, comprising a controller according to embodiments of the present invention. In another aspect, there is provided a hydraulic actuator comprising a computer-readable storage medium, comprising statements and instructions which, when executed, cause a computer (or a processor in data communication with the actuator) to perform a method according to embodiments of the present invention.

Embodiments of the present invention can find application in association with hydraulic actuators used in many applications. For instance, they are widely used to drive robotic manipulators in industry for earth moving, material handling, and in the areas of construction, forestry and manufacturing automation. Other applications include high power industrial machinery such as machine tools, aircraft, material handling, construction, mining, and agricultural equipment. Robotic uses include assembly tasks, mobile robots, and robotic applications in space, for example with Special Purpose Dexterous Manipulators (SPDMs) such as the Canadarm™. General engineering applications include vibration isolation and automobile active suspension. Military applications also exist in aerospace, aviation, submarines and maritime applications.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A composite controller for a hydraulic actuator, the hydraulic actuator for generating a manipulating influence to be applied to a load, the controller comprising:
a dynamic feedback linearizing controller inner loop for controlling the hydraulic actuator in accordance with a stored linear model representing non-linear dynamic behaviour of an unloaded hydraulic actuator; and
a robust linear controller outer loop for compensating for non-linearities in the linear model based on an uncertainty model representing deviation of the linear model from linearity, the uncertainty model having a non-linear component and a linear time invariant component and an estimated upper bound, the robust linear controller having time invariant dynamics.

2. The controller of claim 1 wherein the inner loop and the outer loop co-operate to permit the hydraulic actuator to generate a desired manipulating influence irrespective of motion of the hydraulic actuator.

3. The controller of claim 1 wherein the hydraulic actuator includes a joint, and wherein the non-linear dynamic behaviour of the unloaded hydraulic actuator is obtained by substantially minimizing effects of the load on the manipulating influence by perturbing the linear model in response to a velocity of the joint.

4. The controller of claim 1 wherein the linear model is based on measured linear parameters of the hydraulic actuator.

5. The controller of claim 1 wherein the linearizing controller includes means for obtaining the linear model based on a linearizing control law for the hydraulic actuator.

6. The controller of claim 5 wherein the linearizing controller includes means for determining the linearizing control law for the hydraulic actuator.

7. The controller of claim 1 further comprising means for calculating the estimated upper bound.

8. The controller of claim 1 wherein the manipulating influence comprises a torque.

9. The controller of claim 1 wherein the manipulating influence comprises a force.

10. The controller of claim 1 wherein the hydraulic actuator is a rotary hydraulic actuator.

11. The controller of claim 1 wherein the hydraulic actuator is a linear hydraulic actuator.

12. A method of designing a hydraulic actuator controller, comprising:
determining an uncertainty model to compensate for differences between a linearized model of the hydraulic actuator and actual behaviour of the hydraulic actuator, the uncertainty model including a non-linear component and a linear time invariant model component;

estimating an uncertainty upper bound, for the uncertainty model, based on identified parameters of non-linear behaviour of the actuator; and designing a robust linear controller based on the determined uncertainty model and the estimated uncertainty upper bound so that the robust linear controller has time invariant dynamics.

13. The method of claim 12 wherein the non-linear component is based on unmodeled actuator dynamics.

14. The method of claim 12 wherein the step of estimating the uncertainty upper bound comprises:

applying a dynamic feedback linearizing inner loop controller in conjunction with the robust linear controller in an outer loop;

exciting the robust linear controller and obtaining measured values of input and output signals; and determining, based on the measured values of input and output signals, a valid value of the uncertainty upper bound the uncertainty model.

15. The method of claim 12 wherein the step of designing the robust linear controller comprises imposing robust stability and performance constraints based on characteristics of the uncertainty model.

16. The method of claim 12 further comprising the step of calculating a linearizing control law based on the identified parameters of non-linear behaviour of the actuator.

17. The method of claim 16 wherein the linearizing control law comprises a dynamic feedback linearizing control law.

18. The method of claim 12 further comprising the step of extracting the identified parameters based on measured signals.

19. A computer-readable storage medium, comprising statements and instructions which, when executed, cause a computer to perform the method of claim 12.

* * * * *